(12) United States Patent
Samukawa et al.

(10) Patent No.: US 8,149,158 B2
(45) Date of Patent: Apr. 3, 2012

(54) DEVICE FOR ESTIMATING INFORMATION ON TARGET OBJECT

(75) Inventors: Yoshie Samukawa, Kariya (JP); Keiji Matsuoka, Kariya (JP); Kouji Shimizu, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 12/751,518

(22) Filed: Mar. 31, 2010

(65) Prior Publication Data

US 2011/0006941 A1 Jan. 13, 2011

(30) Foreign Application Priority Data

Jul. 9, 2009 (JP) .................................. 2009-162773

(51) Int. Cl.
*G01S 13/00* (2006.01)
(52) U.S. Cl. ........... 342/70; 342/105; 342/109; 342/123
(58) Field of Classification Search .................... 342/70, 342/105, 109, 123
See application file for complete search history.

(56) References Cited

U.S. PATENT DOCUMENTS

| 5,278,564 | A | 1/1994 | Groenenboom | |
|---|---|---|---|---|
| 6,266,005 | B1 | 7/2001 | Schneider | |
| 2006/0158758 | A1 * | 7/2006 | White | 359/871 |
| 2008/0111733 | A1 * | 5/2008 | Spyropulos et al. | 342/189 |

FOREIGN PATENT DOCUMENTS

| JP | A-H05-196725 | 8/1993 |
|---|---|---|
| JP | A-H06-034755 | 2/1994 |
| JP | A-2001-124848 | 5/2001 |
| JP | A-2001-515601 | 9/2001 |
| JP | A-2004-198438 | 7/2004 |
| JP | A-2007-298409 | 11/2007 |
| JP | A-2008-122391 | 5/2008 |

OTHER PUBLICATIONS

Mituru Nakamura, et al., "Development of 76GHz millimeter wave radar for measuring vehicle distance," Japan Society of Mechanical Engineers, No. 006, Dynamics and Design Conference 2000, Sep. 5-8, 2000 (English abstract provided and discussed on p. 21 of specification).

Shigeki Ohshima, et al., "Estimation of Received Signal Characteristics for Millimeter Wave Car Radar," Technical Journal R&D Review of Toyota CRDL, Jun. 1997, vol. 32, No. 2, pp. 47-56 (English abstract provided and discussed on p. 56 of specification).

Office Action mailed on May 10, 2011 issued from the Japanese Patent Office in the corresponding Japanese Patent Application No. 2009-162773 (English translation enclosed).

* cited by examiner

*Primary Examiner* — Timothy A Brainard
(74) *Attorney, Agent, or Firm* — Posz Law Group, PLC

(57) ABSTRACT

A target object information estimating device embodied by an electronically agile radar sensor is mounted in a moving vehicle. The device has a unit outputting a radar wave every measuring period, receiving radar waves reflected from a target object through different transmission paths and calculating a distance to the object in each measuring period to detect the object, a unit tracking the object in a tracking term of measuring periods, a unit setting the distance changed with time as a null distance each time electric power of the received waves is reduced to a minimal value, and a unit producing an actual pattern of null points corresponding to the null distances, collating the actual pattern with modeled patterns corresponding to various heights and estimates the height of the object from the collation result as information about the object.

12 Claims, 9 Drawing Sheets

FIG. 6

DISTANCE REGIONS

| HEIGHT (cm) | R20 | R100 | R110 | R120 | R130 | R140 | R150 | R160 | R170 | R180 | R190 | R200 |
|---|---|---|---|---|---|---|---|---|---|---|---|---|
| 0 | 0 | 0 | 0 | 0 | 0 | 0 | 0 | 0 | 0 | 0 | 0 | 0 |
| 10 | 1 | 0 | 0 | 0 | 0 | 0 | 0 | 0 | 0 | 0 | 0 | 0 |
| 20 | | | | | | | | | | | | |
| 30 | | | | | | | | | | | | |
| ⋮ | | | | | ⋮ | | | ⋮ | | | | |
| 190 | | | | | | | | | | | | |
| 200 | 1 | 1 | 0 | 1 | 0 | 1 | 0 | 0 | 0 | 1 | 0 | 0 |
| 210 | | | | | | | | | | | | |
| ⋮ | | | | | ⋮ | | | ⋮ | | | | |
| 340 | | | | | | | | | | | | |
| 350 | 1 | 1 | 1 | 1 | 1 | 1 | 1 | 1 | 1 | 1 | 1 | 1 |

FIG. 7

DISTANCE REGIONS

| | | R20 | R100 | R110 | R120 | R130 | R140 | R150 | R160 | R170 | R180 | R190 | R200 |
|---|---|---|---|---|---|---|---|---|---|---|---|---|---|
| $P_{10}$ | 10 | 1 | 0 | 0 | 0 | 0 | 0 | 0 | 0 | 0 | 0 | 0 | 0 |
| $P_{200}$ | 200 | 1 | 1 | 0 | 1 | 0 | 1 | 0 | 0 | 0 | 1 | 0 | 0 |
| $P_{350}$ | 350 | 1 | 1 | 1 | 1 | 1 | 1 | 1 | 1 | 1 | 1 | 1 | 1 |

DEVICE FOR ESTIMATING INFORMATION ON TARGET OBJECT

CROSS-REFERENCE TO RELATED APPLICATION

This application is based upon and claims the benefit of priority of the prior Japanese Patent Application 2009-162773 filed on Jul. 9, 2009, so that the contents of which are incorporated herein by reference.

BACKGROUND OF THE INVENTION

1. Field of the Invention

The present invention relates to a device for estimating information on a target object existing around a vehicle by radiating a radar wave and receiving the wave reflected from the object.

2. Description of Related Art

A millimeter wave radar apparatus located in a controlled vehicle has been used to detect information on a target object existing around the vehicle. This radar apparatus radiates a beam of radar wave set in the millimeter wave band as a high-frequency signal while mechanically or electrically scanning the wave in the horizontal direction (i.e., a width direction of the vehicle) and detects, from the wave reflected from the object, a distance from the vehicle to the target object, a relative speed of the target object to the vehicle, a bearing angle from the vehicle to the target object and the like as information on the target object. The beam of the radar wave has a predetermined width in the vertical direction (i.e., a height direction of the vehicle).

This radar apparatus cannot detect the height of the object (i.e., information on the object in the height direction). Therefore, it is difficult for the radar apparatus to distinguish an unnecessary reflecting object having no possibility of collision with the controlled vehicle from an obstacle (e.g., an object dropped on the road or a forward vehicle running in front of the controlled vehicle) having a probability of collision with the controlled vehicle. Because the vehicle can pass over a lid of a man hole located on the road or can pass under a signboard located over the road, the lid and the signboard denote the unnecessary reflecting objects.

To solve this problem, there is an idea that the beam width of the radar wave in the vertical direction is narrowed to narrow the information detecting range in the vertical direction. In this idea, the radar apparatus hardly detects the unnecessary reflecting object. However, when the vehicle is placed at a point at which the road gradient (i.e., inclination of the road in the vertical direction) is changed, the detecting distance of the apparatus is reduced, and the apparatus cannot detect the obstacle which is away from the vehicle by a distance longer than the reduced detecting distance. Further, as the change in the road gradient is increased (i.e., as the radius of a crossing curve is reduced), the reduction of the detecting distance is enlarged. Therefore, it is improper to excessively narrow the beam width in the vertical direction.

The radar wave reflected from a target object returns to the radar apparatus through a plurality of transmission paths, and the reflected waves transmitted through the respective paths interfere with each other in the radar apparatus. In this case, the electric power of the reflected waves received in the radar apparatus is changed with the distance to the reflecting object due to the multipath phenomenon.

Published Japanese Patent First Publication No. H05-196725 proposes an idea for receiving radar waves reflected at a reflecting point and returned to a radar apparatus through respective transmission paths and detecting the height of the reflecting point from a change in the electric power of the received waves changed with the distance due to the multipath phenomenon. When the height of a reflecting point (i.e., the height of a locating position at which a target object is located to be placed over the road or the height of a target object located on the road) reflecting the radar wave is higher than the road surface, the multipath phenomenon occurs in the received radar waves. In this case, a phase difference based on a path length difference occurs between the reflected wave directly returned from the target object to the apparatus and the reflected wave returned from the target while being once reflected on the road surface. When the phases of the received waves differ from each other approximate $\pi$ radians, these received waves almost cancel out at the wave receiving point of the apparatus, and the electric power of the received waves is considerably reduced.

The reduction of the received electric power will be described with reference to FIG. 1. FIG. 1 is an explanatory view showing a typical model of reflected waves returned from a target object to a radar apparatus through respective paths. The radar apparatus is located on a controlled vehicle Vc and stores the height h of a wave transmitting and receiving point A. As shown in FIG. 1, a reflecting point B of the target object is placed at a height H and is spaced from the receiving point A of the radar apparatus by a distance R in the horizontal direction. One reflected wave is directly returned to the apparatus through a transmission path having a transmission distance $R_{AB}$, while another reflected wave is returned to the apparatus through another transmission path having a transmission distance $R_{ACB}$ while being once reflected on the road surface at a road reflecting point C. When the apparatus receives the reflected waves at the receiving point A having a known height h, the received waves interfere with each other. The phase difference between the received waves at the receiving point A is changed with the difference $R_{ACB}-R_{AB}$, and this difference is determined from the height H of the target object B and the distance R. Therefore, the electric power P of the received waves is determined from the height H and the distance R according to a function f indicated by the equation (1).

$$P = f(H, R) \tag{1}$$

Therefore, the height H is expressed according to a function g indicated by the equation (2).

$$H = g(R, P) \tag{2}$$

When the phases of the received waves having the path difference $R_{ACB}-R_{AB}$ differ from each other approximately by $\pi$ radians, the power P is reduced to a minimal value $P_{null}$, and the distance R is equal to a specific value (hereinafter, called a null distance) $R_{null}$. Therefore, when the apparatus detects the power equal to the minimal value $P_{null}$ while detecting the null distance $R_{null}$, the height H ($H = g(R_{null}, P_{null})$) can be determined.

Accordingly, it is possible to detect the height of each target object with comparatively high precision. However, the computing load required to detect heights of many target objects becomes large. Therefore, a processor having a high throughput is inevitably required.

Published Japanese Patent First Publication No. 2004-198438 proposes an idea for judging, from a change in the electric power of the received waves, whether or not the multipath phenomenon is caused in the received waves. When the electric power of the received waves is changed, because a target object has a height so as to cause the multipath phenomenon, it is judged that the probability that a vehicle can pass over the target object is low. In contrast, when the electric power of the received waves is not changed, because a target object has a height so as not to cause the multipath phenomenon, it is judged that the probability that a vehicle can pass over the target object is high.

Therefore, even when a processor having a comparatively low throughput is used for the detection of target objects, it is possible to judge whether or not a vehicle holding the radar apparatus can pass over each target object. However, it is impossible to distinguish an obstacle, which is placed on the road and has a probability of collision with the vehicle, from an unnecessary reflecting object (e.g., a signboard or a traffic signal located over the road at a high position) under which the vehicle can pass.

SUMMARY OF THE INVENTION

A main object of the present invention is to provide, with due consideration to the drawbacks of the conventional radar apparatus, a device which estimates the height of a target object, detected by using a radar wave, as information on the target object at a low computing load.

A subordinate object of the present invention is to provide a device which is mounted in a vehicle and estimates, at a low computing load, information on a target object indicating that the target object has no possibility of collision with the vehicle or has a probability of collision with the vehicle.

According to a first aspect of this invention, the main object is achieved by the provision of a target object information estimating device comprising an object detecting unit, an object tracking unit, a null distance setting unit, a modeled null point pattern preparing unit and an information estimating unit. The object detecting unit (1) outputs a transmission signal of a radar wave every measuring period of time, (2) receives a signal of the radar wave, which is reflected on a target object located on or over a reference surface and is returned to the device through a first transmission path having a first length, and the radar wave which is reflected on the target object and is returned to the device through a second transmission path having a second length different from the first length, and (3) calculates an object distance, from the device to the target object, from the transmission signal and the received signal in each of the measuring periods to detect the target object. The object distance is changed with time. The object tracking unit tracks the target object in a tracking term including a plurality of measuring periods. The null distance setting unit sets the object distance, when the target object is tracked by the object tracking unit, as a null distance, each time electric power of the received radar waves is reduced to a minimal value. The modeled null point pattern preparing unit prepares a modeled null point pattern indicating a modeled pattern of null points for each of a plurality of heights from the reference surface. The information estimating unit produces an actual null point pattern indicating a pattern of null points corresponding to the respective null distances, collates the actual null point pattern with the modeled null point patterns to obtain a collation result, and estimates a height of the target object from the collation result as information about the target object.

With this structure of the device, the reflected radar wave returned to the device through the first transmission path and the reflected radar wave returned to the device through the second transmission path cancel out when the object distance is equal to one of the null distances. Therefore, each time electric power of the received radar waves is reduced to a minimal value, the object distance becomes equal to one null distance corresponding to one null point. Further, the null distance is changed with the height of the target object, so that the actual null point pattern produced from the null distances depends on the height of the target object. Moreover, a modeled pattern of null points in a predetermined distance region can be theoretically or experimentally formed for each of heights from the reference surface such as a road surface.

Therefore, the height of the target object can be estimated from the result of collation of the actual null point pattern with the modeled null point patterns. For example, one modeled null point pattern substantially matching with the actual null point pattern is determined, and the height corresponding to the determined modeled null point pattern is estimated as the height of the target object.

Accordingly, because the height of the target object is estimated from the collation of the actual null point pattern with the modeled null point patterns, the computing load required for this estimation can be reduced, and the height of the target object can be estimated as information on the target object at a low computing load.

According to a second aspect of this invention, the subordinate object is achieved by the provision of a target object information estimating device, which is mounted in a moving vehicle which can pass under an object being placed over a road surface at a height equal to or higher than a first height, comprising the object detecting unit, the object tracking unit, the null distance setting unit, a modeled null point pattern preparing unit, an object type judging unit, an actual null point pattern producing unit, and a collision probability estimating unit.

The modeled null point pattern preparing unit prepares a modeled null point pattern, indicating a modeled pattern of null points, corresponding to the first height. The object type judging unit judges whether or not the target object is a stationary target object. When the object type judging unit judges that the target object is a stationary target object, the actual null point pattern producing unit produces an actual null point pattern indicating a pattern of null points corresponding to the respective null distances set by the null distance setting unit. The collision probability estimating unit collates the actual null point pattern with the modeled null point pattern, estimates the stationary target object to have a probability of collision with the vehicle, as information on the target object, when the actual null point pattern differs from the modeled null point pattern, and estimates the stationary target object to have no possibility of collision with the vehicle, as information on the target object, when the actual null point pattern substantially matches with the modeled null point pattern.

With this structure of the device, by performing the collation of the actual null point pattern with only one modeled null point pattern, the stationary target object is estimated to have a probability of collision with the vehicle or to have no possibility of collision with the vehicle.

Accordingly, the device can distinguish the target object having a probability of collision with the vehicle from the target object having no possibility of collision with the vehicle, and information indicating a probability of collision with the vehicle or no possibility of collision with the vehicle can be obtained as information on the target object, at a low computing load.

BRIEF DESCRIPTION OF THE DRAWINGS

FIG. 6 shows a table of modeled null point patterns prepared in advance in the processor;

FIG. 7 shows three modeled null point patterns used for a judgment on a probability of collision of a controlled vehicle having the device with an object;

DETAILED DESCRIPTION OF THE PREFERRED EMBODIMENT

Figure 2:
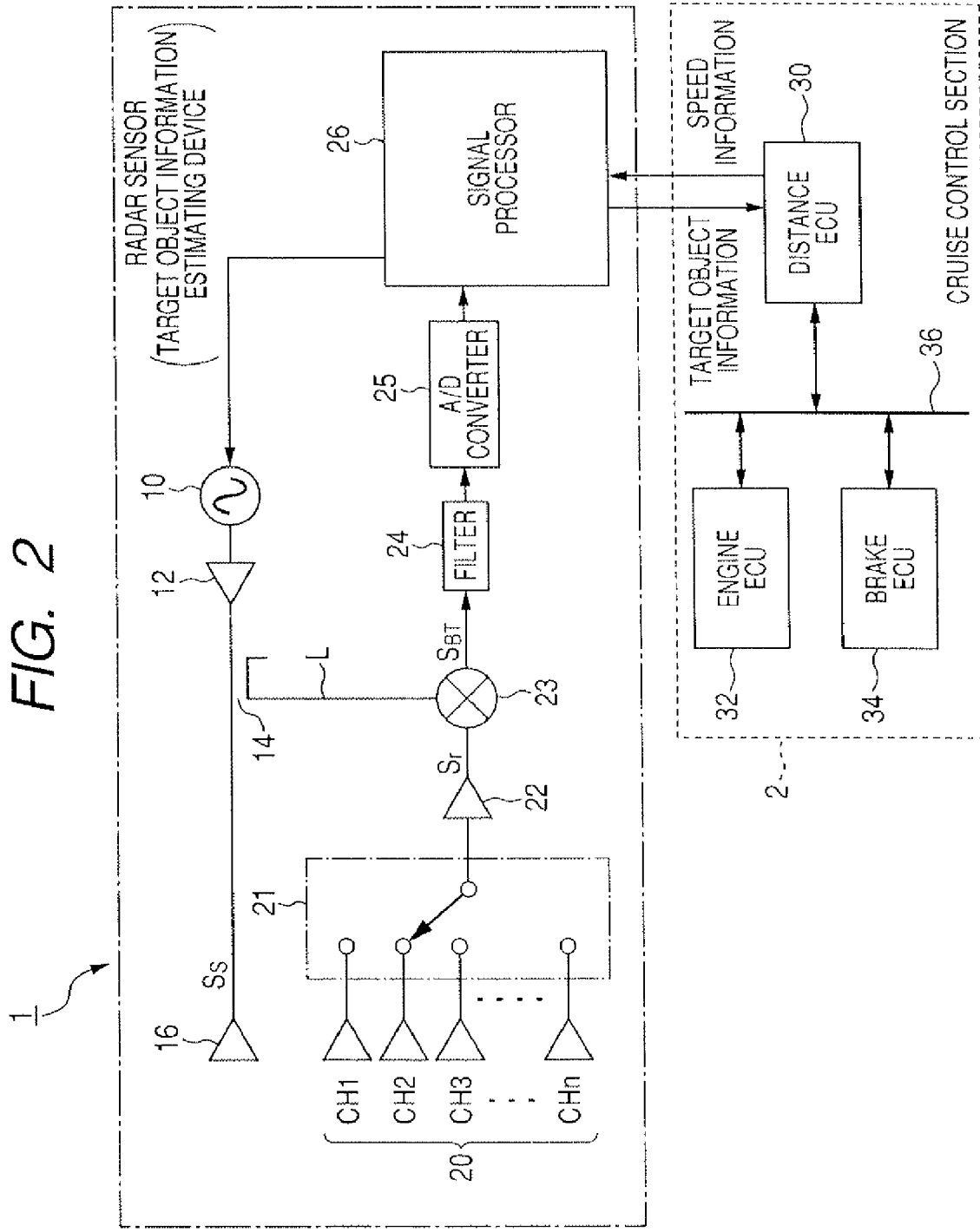
FIG. 2 is a block diagram of a vehicle control system with a radar sensor acting as a target object information estimating device according to an embodiment of the present invention.

An Embodiment of the present invention will now be described with reference to the accompanying drawings.
Embodiment FIG. 2 is a block diagram of a vehicle control system with a radar sensor acting as a target object information estimating device according to this embodiment. As shown in FIG. 2, a vehicle control system mounted in a controlled vehicle has a radar sensor 1 for radiating radar waves and receiving radar waves reflected from target objects to produce information about the target objects from the radiated and received waves, and a cruise control section 2 for performing cruise control for the controlled vehicle according to the information.

The radar sensor 1 is formed of a frequency modulated continuous wave (FM CW) type electronically agile radar. This sensor 1 radiates a beam of frequency-modulated radar waves, set in the millimeter wave band, in the running direction of the vehicle and receives waves reflected from each of objects. The sensor 1 acts as a target object information estimating device which detects the objects from the radiated and received radar waves, recognizes some of the objects as target objects, produces information about each target object, and outputs the information.

The target object information contains the object distance from the controlled vehicle to the target object, the relative speed of the target object to the controlled vehicle, the bearing angle from the controlled vehicle to the target object, a probability (indicated by a high probability or a low probability) of collision of the target object with the controlled vehicle, estimated height and width of the target object having a probability of collision, and the like.

Each target object is located on or over the road. The height is defined as a length from the road surface (representing a reference surface) in the direction perpendicular to the road surface. The height of the target object located on the road denotes the height of the target object itself. The height of the target object located over the road denotes the height of a point on which the target object is put.

The cruise control system controls the controlled vehicle according to the estimated information such that the vehicle is automatically moved so as not to collide with any target object. The cruise control system has a distance electronic control unit (ECU) 30 for controlling the inter-vehicle distance between the controlled vehicle and a forward vehicle, running in front of the controlled vehicle, according to the information on the forward vehicle recognized in the sensor 1, an engine ECU 32 for controlling the driving force produced in an engine of the vehicle according to an engine control signal transmitted from the distance ECU 30 though a communication bus 36 of the local area network (LAN), and a brake ECU 34 for controlling a braking torque produced by a brake of the vehicle according to a brake control signal transmitted from the ECU 30 though the bus 36. Each of the ECU 30, the ECU 32 and the ECU 34 has a well-known microcomputer and a bus controller for controlling the communication with each of the other ECUs through the bus 36. In this embodiment, the data communication between the ECUs 30, 32 and 34 is performed according to the protocol of the controller area network (CAN) proposed by Robert Bosch Corporation. This protocol is generally used for the on-board network.

The distance control ECU 30 is connected with the radar sensor 1 to receive the target object information from the sensor 1 and to transmit information on a vehicle speed to the sensor 1. The ECU 30 is also connected with an alarm buzzer, a cruise control switch, a target inter-vehicle distance setting switch and the like (not shown). When the cruise control switch is turned on, the cruise control system starts performing the cruise control according to the information on the target objects recognized in the sensor 1. When the setting switch is turned on, the ECU 30 controls the ECU 32 and the ECU 34 according to the information on the target objects so as to adjust the inter-vehicle distance at a desired distance.

The brake ECU 34 detects conditions of the brake pedal from detection data of an M/C pressure sensor (not shown) in addition to detection data (e.g., a steering angle and a yaw rate) of a steering sensor and a yaw rate sensor (not shown), outputs the conditions of the brake pedal to the distance ECU 30, receives information on a target acceleration and a brake request from the distance ECU 30, and drives a brake actuator according to the conditions of the brake pedal, the target acceleration and the brake request to repeatedly open and close each of a pressure increasing valve and a pressure reducing valve of a brake hydraulic unit. Therefore, the brake ECU 34 can control the brake torque.

The engine ECU 32 transmits detection data (e.g., a vehicle speed detected in a vehicle speed sensor, engine control conditions detected in throttle angle sensors of an internal combustion engine, and an acceleration operating condition detected in an acceleration stroke sensor) to the distance ECU 30, receives information on a target acceleration, a fuel cut request and the like from the distance ECU 30, and drives throttle actuators according to the engine operating conditions specified by the received information and the request for adjusting the throttle angle sensors. Therefore, the engine ECU 32 can control the driving force.

The distance ECU 30 receives information on the vehicle speed and the engine control conditions from the engine ECU 32, and receives information on the steering angle, the yaw rate and the brake control condition from the brake ECU 34. The distance ECU 30 produces information on the target acceleration, the fuel cut request and the like from the setting state of the cruise control switch, the setting state of the target inter-vehicle distance setting switch and the detected target object information of the sensor 1, and transmits the produced information to the engine ECU 32 as a control instruction for adjusting the inter-vehicle distance at a proper value. The distance ECU 30 transmits information on the target acceleration and a brake request to the brake ECU 34. The distance ECU 30 judges whether or not the inter-vehicle distance is excessively shortened, and controls the buzzer to output an alarm in response to the excessively-shortened inter-vehicle distance.

The radar sensor 1 has an oscillator 10 for generating a high frequency signal of a frequency-modulated high frequency wave set in the millimeter wave band, an amplifier 12 for amplifying the high-frequency signal of the oscillator 10, a distributor 14 for distributing electric power of the amplified high-frequency signal to each of two signal lines to produce a transmission signal Ss and a local signal L, and a transmitting antenna 16 for radiating a beam of radar wave modulated with the transmission signal Ss to substantially output the transmission signal Ss.

The antenna 16 is located on a front surface of the controlled vehicle. The radiated beam has a horizontal width and a vertical width. The radar wave radiated from the radar sensor 1 is reflected by each of objects and is returned to the sensor 1.

The radar sensor 1 further has a wave receiving antenna section 20, located on the front surface of the controlled vehicle, for receiving beams of radar waves reflected from each object as a received signal Sr in each of a plurality of antenna elements, a selector switch 21 for selecting each of the antenna elements of the section 20 one by one, an amplifier 22 for amplifying the received signal Sr of each antenna element selected by the switch 21, a mixer 23 for mixing the amplified received signal Sr and the local signal L obtained from the distributor 14 to produce a beat signal $S_{BT}$, a filter 24 for performing a filtering operation for the beat signal $S_{BT}$ to remove unnecessary components from the beat signal. $S_{BT}$, an analog-to-digital (A/D) converter 25 for converting an analog level of the filtered beat signal $S_{BT}$ into digital data to obtain sampling data, and a signal processor 26 for controlling the oscillator 10 to start and stop the generation of the high frequency signal, controlling the selection operation of the switch 21 and the sampling operation of the converter 25, receiving the speed information from the ECU 30, performing the signal processing for the sampling data according to the speed information to recognize some objects as target objects and to estimate the target object information on each target object, and sending the target object information to the ECU 30.

Each antenna element of the receiving antenna section 20 has a size so as to receive the whole beam of radar waves radiated from the transmitting antenna 16. A plurality of receiving channels $CH_1$ to $CH_N$ are allocated to the respective antenna element.

The processor 26 has a well-known microcomputer composed of a central processing unit (CPU), a read only memory (ROM) and a random access memory (RAM). The processor 26 further has an arithmetic processor (e.g., a digital signal processor) for performing the fast Fourier transform (FFT) for the sampling data of the converter 25.

Figure 3:
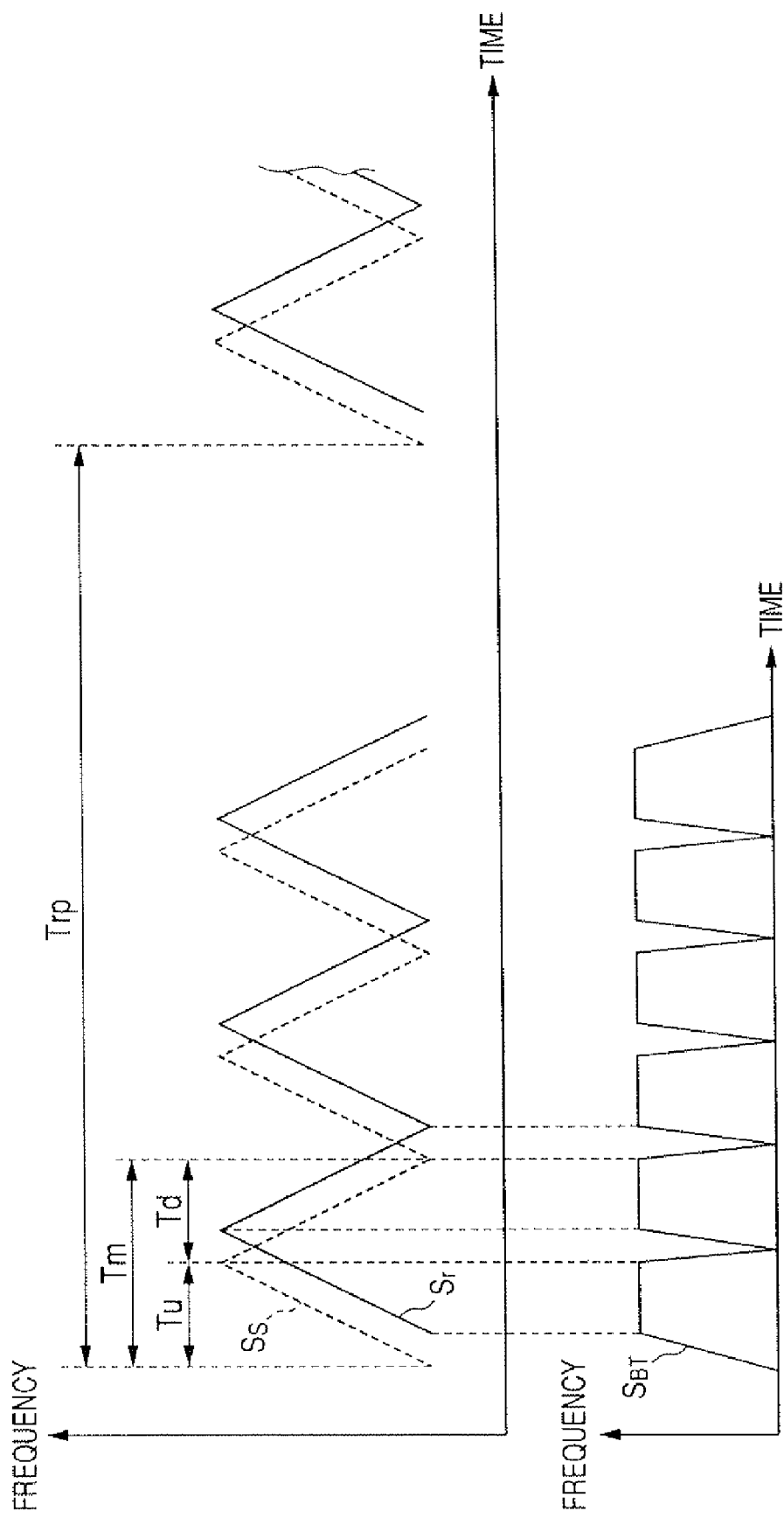
FIG. 3 is a time chart showing a change of frequency in each of a transmission signal, a received signal and a beat signal.

FIG. 3 is a time chart showing a change of the frequency in each of the transmission signal Ss, the received signal Sr and the beat signal $S_{BT}$. To produce the signal Ss shown in FIG. 3, the processor 26 controls the oscillator 10 to linearly increase the frequency of the high frequency signal with time in an up period of time Tu and to linearly decrease the frequency of the high frequency signal with time in a down period of time Td succeeding the up period Tu. The combination of the up and down periods forms one modulation period of time Tm. The processor 26 sets a predetermined number of (e.g., three) modulation periods Tm successively arranged in one repetition period of time Trp (e.g., 100 msec). The processor 26 controls the oscillator 10 to generate the high frequency signal every modulation period Tm.

When the controlled vehicle is moved, in response to an instruction of the processor 26, the oscillator 10 starts the wave generating operation to generate the high frequency signal every modulation period Tm. This high-frequency signal is amplified in the amplifier 12, and electric power of the amplified high-frequency signal is distributed in the distributor 14 to produce a transmission signal Ss and a local signal L. Then, a beam of radar wave modulated with the signal Ss is radiated from the transmitting antenna 16. The local signal L is sent to the mixer 23.

When a beam of radiated radar wave is reflected by an object, a plurality of beams of reflected waves are returned to the sensor 1 through a plurality of transmission paths while causing the multipath phenomenon. The reflected beams of waves are received as a plurality of received signals Sr in the respective antenna elements of the receiving antenna, section 20, and the received signals Sr selected by the selector switch 21 one after another are amplified in the amplifier 22. Then, each received signal Sr is mixed with the local signal L in the mixer 23 to produce a beat signal $S_{BT}$. This beat signal $S_{BT}$ has a component indicating a difference in frequency between the transmission signal Ss and the received signal Sr. The beat signal $S_{BT}$ is filtered in the filter 24 and is converted in the A/D converter 25 into digital data as sampling data. These sampling data are processed in the processor 26.

As well known, the frequency of the beat signal $S_{BT}$ is proportional to a propagation delay time equal to a turn-around time of the transmission signal Ss required to go to and return from the object. Therefore, the processor 26 can calculates the object distance in the horizontal direction between the controlled vehicle and the object from the beat signal $S_{BT}$.

The switch 21 selects each of the receiving channels CHi (i ranges from 1 to N) at a switching timing. This selection of each channel is performed a predetermined number of times (e.g., 512 times) every modulation period Tm. The converter 25 performs the sampling operation in synchronization with each switching timing. Therefore, sampling data corresponding to the channels $CH_1$ to $CH_N$ are stored in the processor 26 for each of the up and down periods every modulation period Tm.

Next, the estimation of information about a target object will be described. This estimation is performed in the processor 26.

The radar sensor 1 radiates a beam of radar wave set at a transmission electric power Pt. When this beam is reflected by a target object and is returned to the sensor 1 according to the typical model shown in FIG. 1, the radar sensor 1 receives a first reflected wave directly returned from the target object and a second reflected wave returned from the target object while being once reflected on the road surface. The radar sensor 1 is located at a height $\Delta H$ and is shifted from the center of the controlled vehicle by an offset value $\Delta X$ in the width direction of the controlled vehicle. The signal processor 26 stores the height $\Delta H$ and the offset value $\Delta X$ in advance.

The electric power P of the reflected waves received in the sensor 1 is expressed as follows:

$$P = 2(4\pi)^{-3} K P t G t G r \lambda^2 \sigma \times \{R_{AB}^{-4} + R_{AB}^{-2}(\rho^{1/2}/R_{ACB})^2 + 2 R_{AB}^{-3}(\rho^{1/2}/R_{ACB})\cos\phi)\} \quad (3)$$

wherein the transmission distance $R_{AB}$ of the first reflected wave, the transmission distance $R_{ACB}$ of the second reflected wave, the phase difference $\phi$ between the reflected waves at the received point A of the sensor 1, the reflection factor $\sigma$ of the road surface at the reflecting point C, the gain Gt of the transmitting antenna 16, the gain Gr of the receiving antenna 20, the reflecting cross section ρ of the receiving antenna 20, the wave length λ of the radar wave, and the constant K are used for the equation (3).

The distances $R_{AB}$ and $R_{ACB}$ and the phase difference φ depending on the difference $R_{ACB}$-$R_{AB}$ are changed with the height H of the object and the object distance R between the controlled vehicle (i.e., the sensor 1) and the object. Therefore, when the multipath phenomenon occurs in the reflected waves, the relation between the electric power P and the distance R can be obtained according to the equation (3), and this relation depends on the height of the object For example, this equation (3) is described in detail in "Development of 76 GHz millimeter wave radar for measuring vehicle distance" Japan Society of Mechanical Engineers, No. 006, Dynamics and Design Conference 2000 (abstract), pp. 229, 20000901.

Figure 4:
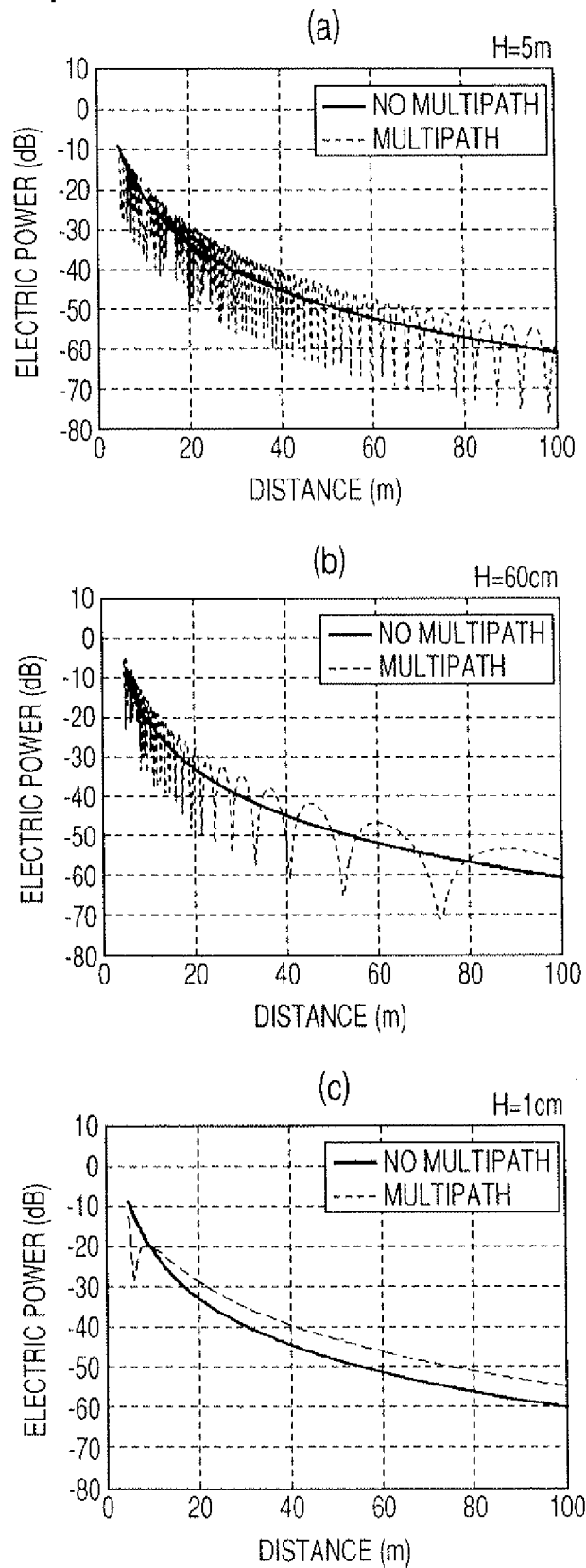
FIG. 4 shows graphs each of which indicates a change of electric power of waves reflected at a point of a specific height and received in the radar sensor.

FIG. 4 shows graphs each of which indicates a change of electric power P of radar waves reflected at a reflecting point and received in the sensor 1. The heights H of the reflecting points (i.e., objects) are set at 5 m, 60 cm and 1 cm, respectively. In these graphs, the relation is indicated by a dotted line when the multipath phenomenon occurs in the reflected waves, while the relation is indicated by a solid line when no multipath phenomenon occurs in the reflected waves. The influence of noise (1/f noise and the like) is considered in the graphs.

As shown in FIG. 4, within the range of the object distance R from 0 to 100 m, each time the object distance R changed with time becomes equal to one of null distances $R_{null}$, the power P is reduced at a minimal value $P_{null}$ at a null point corresponding to the null distance $R_{null}$. As the height of the reflecting point is increased, the interval between adjacent null points is narrowed (i.e., the interval between adjacent null distances $R_{null}$ is shortened). When the height of the reflecting point is lower than several cm, no null point occurs. For example, when the lid of a man hole present on the road is positioned in front of the vehicle, the sensor 1 detects no null point in the distance region longer than 20 m. Therefore, a pattern of null points in a predetermined region of the object distance R is changed with the height of the object reflecting the radar wave to the sensor 1.

In this embodiment, the sensor 1 acting as the target object information estimating device measures the distance to an object every modulation period Tm to detect the object. Therefore, the modulation period Tm is called a measuring period hereinafter. When the sensor 1 can track a detected object in a tracking term including a plurality of measuring periods Tm, the processor 26 recognizes the object as a target object. When the target object has a probability of collision with the controlled vehicle, the processor 26 produces an actual pattern of null points in a predetermined region of the object distance R, determines a modeled pattern matching with the actual pattern, and estimates the height corresponding to the determined pattern as the height H of the target object. The target object is present at the height H.

Figure 5:
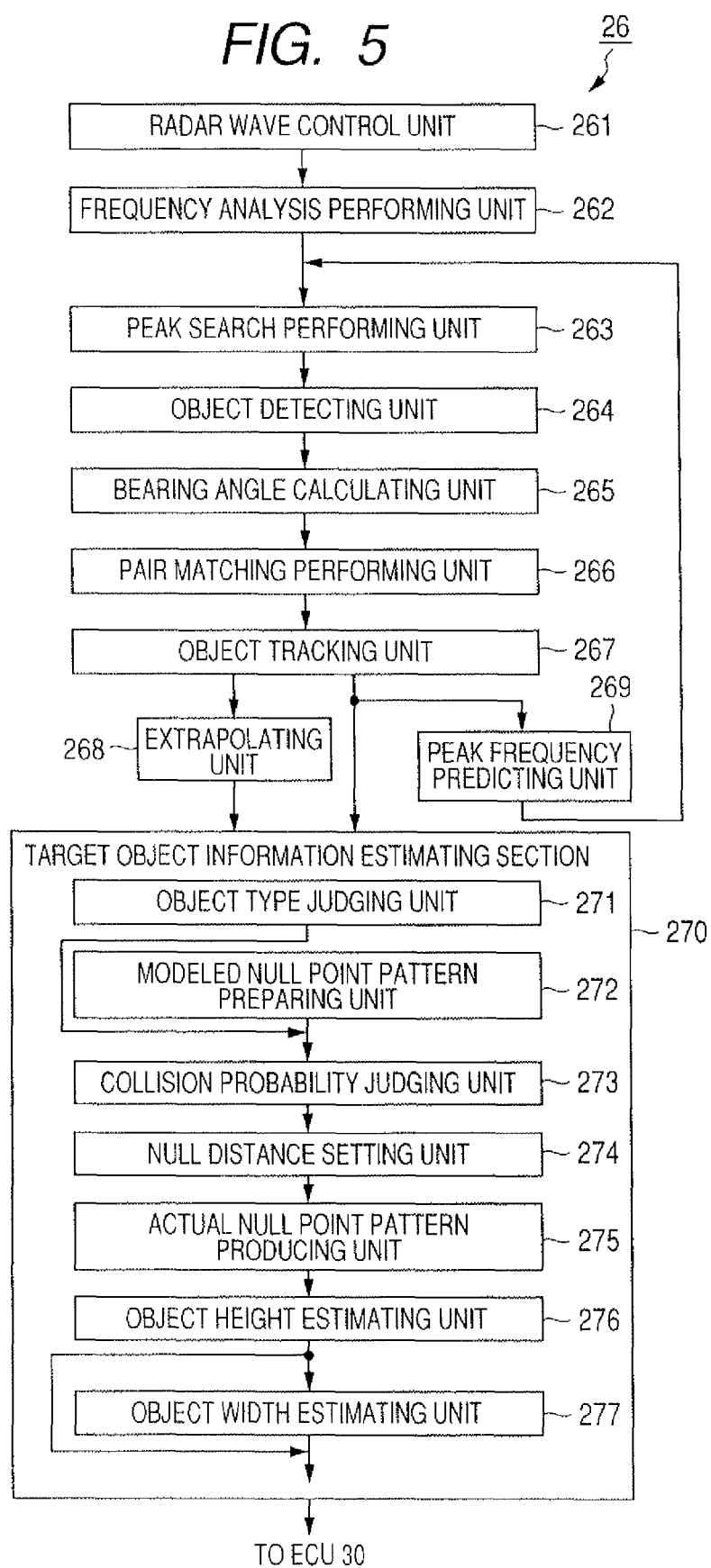
FIG. 5 is a block diagram of a processor of the radar sensor.

FIG. 5 is a block diagram of the processor 26. As shown in FIG. 5, the processor 26 has:

a radar wave control unit 261 for controlling a beam of radar waves radiated from the transmitting antenna 16 every measuring period Tm such that the antenna section 20 receives a beam of radar waves, reflected on each of a plurality of objects and returned to the radar sensor 1 through a first transmission path having a first length, and a beam of radar waves reflected on the target object and returned to the device through a second transmission path having a second length different from the first length, a frequency analysis performing unit 262 for performing the frequency analysis for the received radar waves to form a power spectrum of the beat signal $S_{BT}$ every channels of the antenna section 20 for each of the up and down periods Tu and Td, a peak search performing unit 263 for searching each of the power spectrums to pick up a peak frequency component, having a peak frequency predicted in the preceding measuring period, from the power spectrum for each object, an object detecting unit 264 for calculating both an object distance R from the controlled vehicle to each object and a relative speed Vr of the object from the peak frequency components of the power spectrums to detect the object.

a bearing angle calculating unit 265 for calculating a bearing angle, from the controlled vehicle to each object, from the peak frequency components corresponding to the channels of the antenna section 20 for each of the up and down periods Tu and Td, a pair matching performing unit 266 for performing a pair matching process for the peak frequency components in the up period and the peak frequency components in the down period to set the components in the up and down periods as an actual pair indicating one object when the bearing angle in the up period is substantially equal to the bearing angle in the down period;

an object tracking unit 267 for judging whether or not each preceding object indicated by the actual pair set in the preceding measuring period is successfully tracked in the present measuring period, judging that the preceding object is successfully tracked when the record (i.e., the distance R and the relative speed Vr in the present measuring period) of the present object indicated by the present actual pair set in the present measuring period is substantially connected with the record (i.e., the distance R and the relative speed Vr in the preceding measuring period) of the preceding object, and setting the present object as a target object of the present measuring period when the present object is successfully tracked during a tracking term composed of a plurality of measuring periods including the present measuring period, an extrapolating unit 268 for setting one preceding actual pair indicating one preceding object as an extrapolating pair of the present measuring period when the preceding actual pair does not have the record connection with any present actual pair, and setting the preceding object indicated by the extrapolating pair as a target object of the present measuring period to estimate the object distance R, expected in the present measuring period, from the object distance R calculated by the unit 264 in the preceding measuring periods according to extrapolation, a peak frequency predicting unit 269 for predicting peak frequencies of peak frequency components of power spectrums, to be formed in the succeeding measuring period, from the record of each target object of the present measuring period, and a target object information estimating section 270 for selecting target objects, having a probability of collision with the controlled vehicle, from the target objects which are set in the units 267 and 268 and estimating the height and width of each selected target object as information on the target object.

The controlled vehicle holding the radar sensor 1 can pass under any object which is located over the road at a height equal to or higher than a first height (e.g., 350 cm) and can pass over any object having a height equal to or lower than a second height (e.g., 10 cm). In contrast, when one target object has a height between the first and second heights, the target object has a probability of collision with the controlled vehicle.

The estimating section 270 has:

an object type judging unit 271 for receiving the running speed of the controlled vehicle, judging each of the target objects set in the units 267 and 268 to be a stationary target object when the relative speed of the target object to the vehicle is substantially equal to the speed of the vehicle or to be a moving target object when the relative speed of the target object differs from the speed of the vehicle, a modeled null point pattern preparing unit 272 for preparing in advance a modeled null point pattern indicating a modeled pattern of null points for each of a plurality of heights within a predetermined distance region and storing the modeled patterns in the ROM of the processor 26, a collision probability judging unit 273 for judging, by using the modeled patterns corresponding to the first and second heights and the modeled pattern corresponding to a middle height between the first and second heights, whether each of the stationary target objects judged in the judging unit 271 is a low-position target object, a middle-height target object or a high-position target object and judges that the stationary target object has a probability of collision with the controlled vehicle when the stationary target object is a middle-height target object, a null distance setting unit 274 for selecting the moving target objects judged in the judging unit 271 and the stationary target objects, judged in the judging unit 271 and judged in the judging unit 273 to be middle-height target objects, as height judging target objects having a probability of collision with the controlled vehicle, and recognizing and setting the distance R as a null distance $R_{null}$, each time electric power of the received radar waves is reduced to a minimal value in the predetermined distance region, for each of the height judging target objects, an actual null point pattern producing unit 275 for producing an actual null point pattern, indicating a pattern of null points corresponding to the respective null distances $R_{null}$ set in the setting unit 274, for each of the height judging target objects, an object height estimating unit 276 for collating the actual null point pattern with the modeled null point patterns for each height judging target object, determining one modeled pattern matching with or most similar to the actual pattern, estimating the height corresponding to the determined modeled pattern as the height of the height judging target object, and an object width estimating unit 277 for regarding each height judging target object as a vehicle, and estimating the width of the height judging target object according to a general ratio of the vehicle height and the vehicle width.

The ROM of the processor 26 stores a software program used for the detection of an object and the determination of the object distance between the controlled vehicle and the object.

FIG. 6 shows a table of the modeled null point patterns prepared in advance in the unit 272 of the processor 26. The object distance R changeable with time is calculated in the detecting unit 264 within the distance region from 0 to 200 m. Therefore, as shown in FIG. 6, the distance area of the modeled patterns ranges from 0 to 200 m. The distance area ranging from 0 to 100 m is divided into a distance region R20 ranging from 0 to 20 m (0≦R20≦20 m) and a distance region (i.e., short distance region) R100 ranging from 20 to 100 m (20<R100≦100 m). The distance area (i.e., long distance region) ranging from 100 m to 200 m is divided into ten distance regions R110 (100<R110≦110 m), R120 (110<R120≦120 m), R130 (120<R130≦130 m), R140 (130<R140≦140 m), R150 (140<R150≦150 m), R160 (150<R160≦160 m), R170 (160<R170≦170 m), R180 (170<R180≦180 m), R190 (180<R190≦190 m) and R200 (190<R200≦200 m) each of which has a region width of 10 m.

The height H of the target object is estimated in the unit 276 within the range from 0 to 350 cm. Therefore, one modeled pattern is prepared in advance for each of thirty-six heights 0, 10, 20, 30, - - - , 190, 200, 210, - - - , 340 and 350 cm set at intervals of 10 cm.

A typical graph indicating the relation between the electric power P of the received waves and the object distance R are prepared according to the equation (3) for each of the thirty-six heights. The influence of noise (1/f noise and the like) is considered in the typical graphs. When at least one null point corresponding to one minimal value of the power exists in one distance region Rj (Rj=R20, R100, R110, R120, R130, R140, R150, R160, R170, R180, R190 or R200) of one typical graph, a map value M(Rj) is set at 1 in the distance region Rj. In contrast, when no null point exists in one distance region Rj of one typical graph, the map value M(Rj) is set at 0 in the distance region Rj. This setting of the map value M(Rj) is performed for each of the distance regions of all typical graphs. Therefore, as shown in FIG. 6, the modeled null point pattern in the distance area ranging from 0 to 200 m is prepared in advance for each of the thirty-six heights.

As the height is increased, the number of distance regions set at the map value M=1 is increased in the modeled pattern. As the distance R is increased, the interval between the adjacent distance regions set at the map value M=1 is lengthened in the modeled pattern.

FIG. 7 shows three modeled null point patterns used in the judging unit 273 for a judgment on a probability of collision with an object. As shown in FIG. 7, the judging unit 273 uses a modeled null point pattern P10 of the power P, a modeled null point pattern P200 of the power P and a modeled null point pattern P350 of the power P. The pattern P10 is obtained by reflecting the radar wave at a reflecting point placed at the height of 10 cm (second height), The pattern P200 is obtained by reflecting the radar wave at a reflecting point placed at the height of 200 cm, and the pattern P350 is obtained by reflecting the radar wave at a reflecting point placed at the height of 350 cm (first height).

The modeled null point pattern P10 represents a null point pattern of the power P obtained by reflecting the radar wave on a low-position target object. This low-position target object reflects the radar wave at a reflecting point set at the height equal to or lower than 10 cm. Therefore, the modeled null point pattern P10 substantially matches with the null point pattern corresponding to the low-position target object. The modeled pattern P200 represents a null point pattern of the power P obtained by reflecting the radar wave on a middle-height target object. This middle-height target object reflects the radar wave at a reflecting point set at the height higher than 10 cm and lower than 350 cm. Therefore, the modeled null point pattern P200 substantially matches with the null point pattern corresponding to the middle-height target object. The modeled pattern P350 represents a null point pattern of the power P obtained by reflecting the radar wave on a high-position target object. This high-position target object reflects the radar wave at a reflecting point set at the height equal to or higher than 350 cm. Therefore, the modeled null point pattern P350 substantially matches with the null point pattern corresponding to the high-position target object.

The controlled vehicle can pass over the low-position target object at a high probability. In other words, the probability that the controlled vehicle collides with the low-position target object is very low. The controlled vehicle can pass under the high-position target object at a high probability. In other words, the probability that the controlled vehicle collides with the high-position target object is very low. In contrast, when the controlled vehicle passes under or over the middle-height target object, the controlled vehicle has a probability of collision with the middle-height target object.

When an object being at a standstill in front of the controlled vehicle is present over the road at a particular height equal to or higher than 350 cm, the object differs from a vehicle parked on the road, a high wall or the like. The height of the vehicle on the road is normally lower than 350 cm. The wall higher than 350 cm is stood on the roadside. Therefore, the object is put over the road at the particular height. As a result, when an object being at a standstill denotes one high-position target object, the controlled vehicle can pass under the object, and the object has no possibility of collision with the controlled vehicle.

When an object being at a standstill in front of the controlled vehicle has a particular height equal to or lower than 10 cm, the controlled vehicle can easily pass over the object. A space between the lower portion of the vehicle and the road surface is normally larger than 10 cm. Therefore, when an object being at a standstill denotes one low-position target object, the object has no possibility of collision with the controlled vehicle.

As represented by the modeled pattern P10, the null point pattern of the low-position target object has one null point only in the distance region R20. As represented by the modeled pattern P200, in the null point pattern of the middle-height target object, a plurality of distance regions set at the map value M=1 are periodically placed in the long distance region (100 m<R≦200 m). As represented by the modeled pattern P350, in the null point pattern of the high-position target object, all distance regions are set at the map value M=1 in the first and long distance regions (20 m<R≦200 m).

Therefore, when the actual null point pattern of a target object has one null point in one distance region of the long distance region (100 m<R≦200 m) in which the modeled pattern R200 has no null point, the judging unit 273 can judge the target object to be a high-position target object. When the actual null point pattern of a target object has one null point in the short distance region R100 (20 m<R≦100 m) on condition that the target object is not any high-position target object, the judging unit 273 can judge the target object to be a middle-height target object having a probability of collision with the controlled vehicle.

Figure 8:
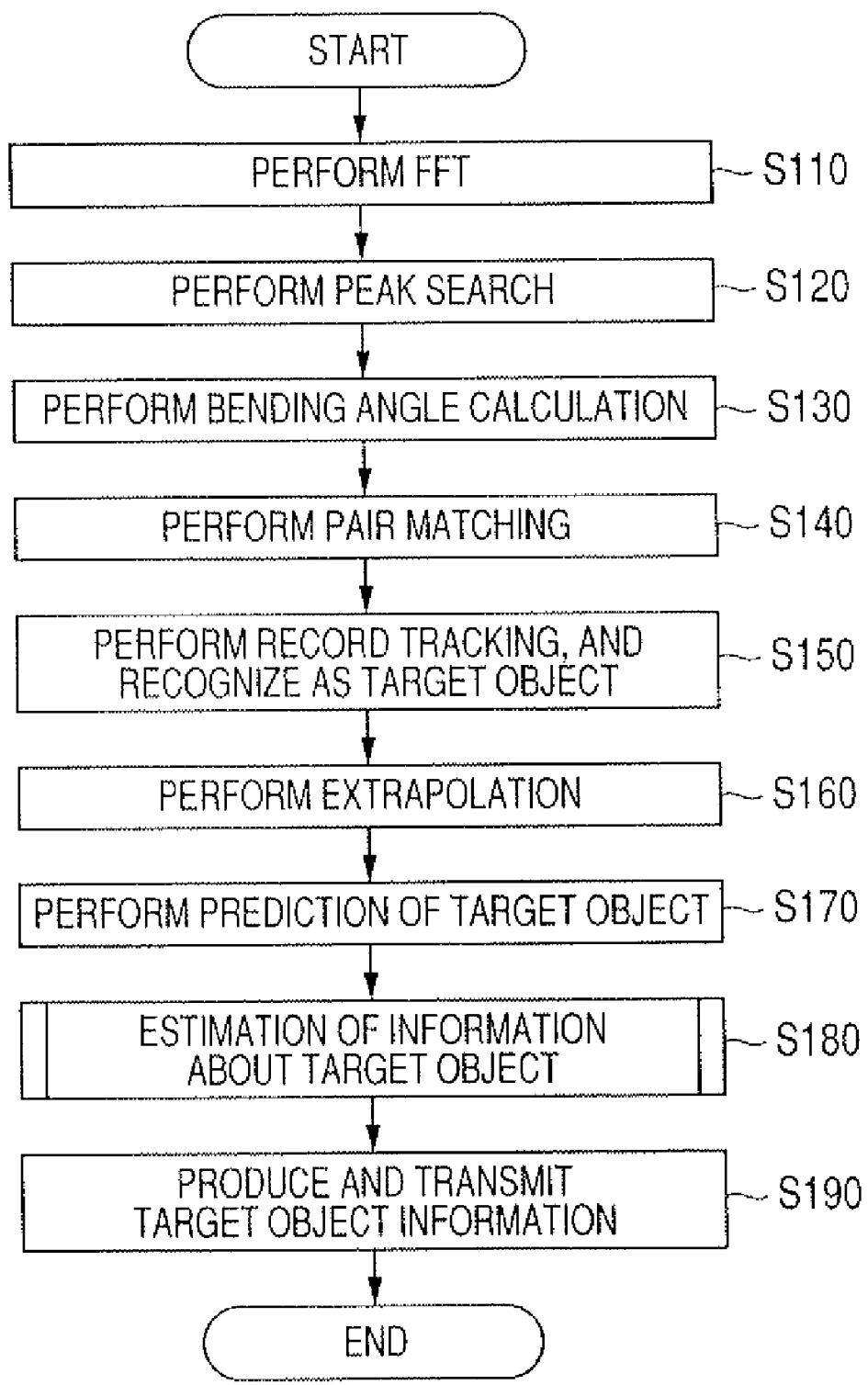
FIG. 8 is a flow chart showing main processes executed in the radar sensor.

FIG. 8 is a flow chart showing the processing of main processes performed in the processor 26. In the processing shown in FIG. 8, object distances R to respective objects are measured every measuring period Tm (see FIG. 3) to detect the objects, target objects are selected from the detected objects, height judging target objects having a probability of collision with the controlled vehicle are selected from the target objects, and information (e.g., speed, position, bearing angle, height, width and the like) about each height judging target object is estimated. To simplify the description of the main processes, the main processes for one object performed in the present measuring period will be described.

As shown in FIG. 8, at step S110, fast Fourier transform (FFT) is performed in the unit 262 to analyze frequency of the beat signal $S_{BT}$ obtained from sampling data and to calculate a power spectrum of the signal $S_{BT}$ every channel CHi for each of the up and down periods Tu and Td.

At step S120, in the unit 263, the peak search is performed for each power spectrum of the signal $S_{BT}$, and a peak frequency component having a peak level is picked up from many frequency components having peak levels in the power spectrum. More specifically, when the frequency of one frequency component having a peak level in the power spectrum matches with a peak frequency predicted in the preceding measuring period, this component is picked up from each power spectrum as a peak frequency component corresponding to the object reflecting the radar wave. For example, when the frequency of the frequency component having a peak level is placed within a predetermined frequency range including the predicted peak frequency, it is judged that the frequency of the frequency component matches with the predicted peak frequency.

In contrast, when the phase of the reflected wave, returned from the detected object to the radar sensor 1 while being once reflected on the road surface, is differentiated from the phase of the reflected wave, directly returned from the detected object to the radar sensor 1, by π radians, the distance R to the object is equal to one null distance $R_{null}$, and the reflected waves are cancelled out. In this case, a peak frequency component having the frequency matching with the predicted peak frequency is sometimes covered with noise or other frequency components having peak levels. Therefore, the peak frequency component having the frequency matching with the predicted peak frequency does not clearly appear in the power spectrum. In this case, extrapolation is performed by using peak frequency components picked up in a plurality of preceding measuring periods, and an extrapolated peak frequency component having the predicted peak frequency is obtained. This extrapolated peak frequency component is set at the zero level or a noise level. The extrapolated peak frequency component is only used to pick up a peak frequency component in the succeeding measuring period.

At step S130, in the calculating unit 265, bearing angle calculation is performed to determine the incoming direction of the reflected waves from peak frequencies of the peak frequency components (not including any extrapolated peak frequency) of the channels $CH_1$ to $CH_N$, for each of the up and down periods. Therefore, a bearing angle from the controlled vehicle to the detected object is calculated from the peak frequencies for each of the up and down periods. This bearing angle calculation is performed according to the FFT or the super resolution method such as MUSIC or the like).

At step S140, in the performing unit 266, the pair matching process is performed for the up peak frequency component group (denoting the peak frequency components of the up period Tu) and the down peak frequency component group (denoting the peak frequency components of the down period Td) picked up in the peak search. More specifically, when the up bearing angle determined from the up peak frequency component group matches with the down bearing angle determined from the down peak frequency component group, the up peak frequency component group is paired with the down peak frequency component group. For example, when the difference between the up and down bearing angles is lower than a matching value, the matching is judged. Then, in the performing unit 266, both the distance R to the detected object and the relative speed Vr of the detected object to the controlled vehicle are calculated from frequencies of the up peak frequency component group and the down peak frequency component group paired with each other according to a well-known method used for the FMCW radar. When the calculated distance R and the calculated relative speed Vr are lower than respective limits, the calculated distance R and the calculated relative speed Vr are registered as a record of the present actual pair corresponding to the object (hereinafter, called a present object), and the present object is detected. The calculated distance and the calculated relative speed corresponding to each of objects (hereinafter, called preceding objects) detected in the preceding measuring period have been already registered in the preceding measuring period as a record of the preceding actual pair.

At step S150, the object tracking unit 267 performs a record tracking process. In this process, the tracking unit 267 judges whether the present actual pair has a record connection with one of the preceding actual pairs. When the record of the present actual pair matches with the record of one preceding actual pair, the unit 267 judges that the radar sensor 1 successfully tracks the object during the preceding and present measuring periods.

More specifically, the present position and the present speed of each preceding object to be expected in the present measuring period are predicted from the record (i.e., the distance and relative speed) of the preceding actual pair corresponding to the preceding object, the difference between the present position of the present object calculated from the record of the present actual pair and the predicted present position of each preceding object is calculated, and the difference between the present relative speed of the present object calculated from the record of the present actual pair and the predicted present relative speed of each preceding object is calculated. When the calculated position difference and the calculated relative speed difference corresponding to one preceding object are lower than respective limits, the tracking unit 267 judges that there is a record connection between the present actual pair and the preceding actual pair, and judges that the present object accords with the preceding object corresponding to the preceding actual pair.

Therefore, the tracking unit 267 can judge that the radar sensor 1 successfully tracks the object during the preceding and present measuring periods. When the object successfully tracked in the present measuring period has been successfully tracked during a plurality of preceding measuring periods (e.g., five measuring periods including the present measuring period), the tracking unit 267 recognizes and sets the present object as a target object of the present measuring period. The record of the present actual pair having the record connection with the record of one preceding actual pair is registered with parameters of the present actual pair to be used in a next measuring period.

At step S160, in the extrapolating unit 268, when at least one preceding actual pair not having the record connection with any of present actual pairs corresponding to target objects set in the present measuring period exists, the target object extrapolating process is performed. When the distance R to an object becomes equal to or approaches one null distance $R_{null}$ in the present measuring period while the distance R differs from any null distance $R_{null}$ in the preceding measuring period, the preceding actual pair corresponding to this object does not have the record connection with any of present actual pairs.

In this extrapolating process, an extrapolated pair with a record and parameters is formed as a pair indicating a present target object which accords with the preceding target object corresponding to the preceding actual pair. The record of this extrapolated pair indicates a present position and a present speed which accords with the predicted present position and the predicted present speed of the preceding target. An object corresponding to the extrapolated pair is set and registered as a target object of the present measuring period.

Further, each target object of the present measuring period is associated with parameters such as a connection number, an extrapolation flag GF and an extrapolation counting number. The connection number indicates how many measuring periods the target object is successfully tracked. The extrapolation flag GF indicates existence of the extrapolated pair corresponding to the target object. The extrapolation counting number indicates how many measuring periods the target object is successively set according to the target object extrapolating process.

Each time the tracking unit 267 sets an object corresponding to the present actual pair as a target object in response to the record connection of the present actual pair with the preceding actual pair, the connection number of the present pair (i.e., the present actual pair) is incremented by 1, the extrapolation flag GF of the present pair is set at 0, and the extrapolation counting number of the present pair is cleared to 0. In contrast, each time the extrapolating unit 268 sets an object corresponding to the present pair (i.e., the extrapolated pair) as a target object, the extrapolating unit 268 resets the connection number of the present pair to 0, sets the extrapolation flag GF of the present pair at 1, and increments the extrapolation counting number of the present pair by 1.

When the extrapolation counting number is lower than a predetermined value, the extrapolating unit 268 judges that the target object is temporarily lost, and forms an extrapolating pair as a pair indicating a present target object which accords with the preceding target object temporarily lost. In contrast, when the extrapolation counting number reaches the predetermined value, the extrapolating unit 268 judges that the target object detected in the preceding measuring period has been permanently lost, and abandons the target object with the record and parameters.

At step S170, in the peak frequency predicting unit 269, the target object predicting process is performed. In this process, from the peak frequency and the bearing angle corresponding to the target object recognized in each of a plurality of measuring periods including the present measuring period, a peak frequency and a bearing angle of the target object expected to be detected in the succeeding measuring period are predicted, and the predicted peak frequency and the predicted bearing angle are sent to the performing unit 273.

At step S180, in the information estimating section 270, the information estimating process is performed based on the record (e.g. the distance R and the relative speed), the extrapolation flag GF obtained in the processes of the units 261 to 269 and the vehicle speed information of the ECU 30.

At step S190, information composed of the speed, position and bearing angle estimated in the units 261 to 269 and information (e.g., the height and width of the target object) estimated in the estimating section 270 is produced as target object information, and the target object information is transmitted to the ECU 30 to notify the driver or passenger of the target object information.

Figure 9:
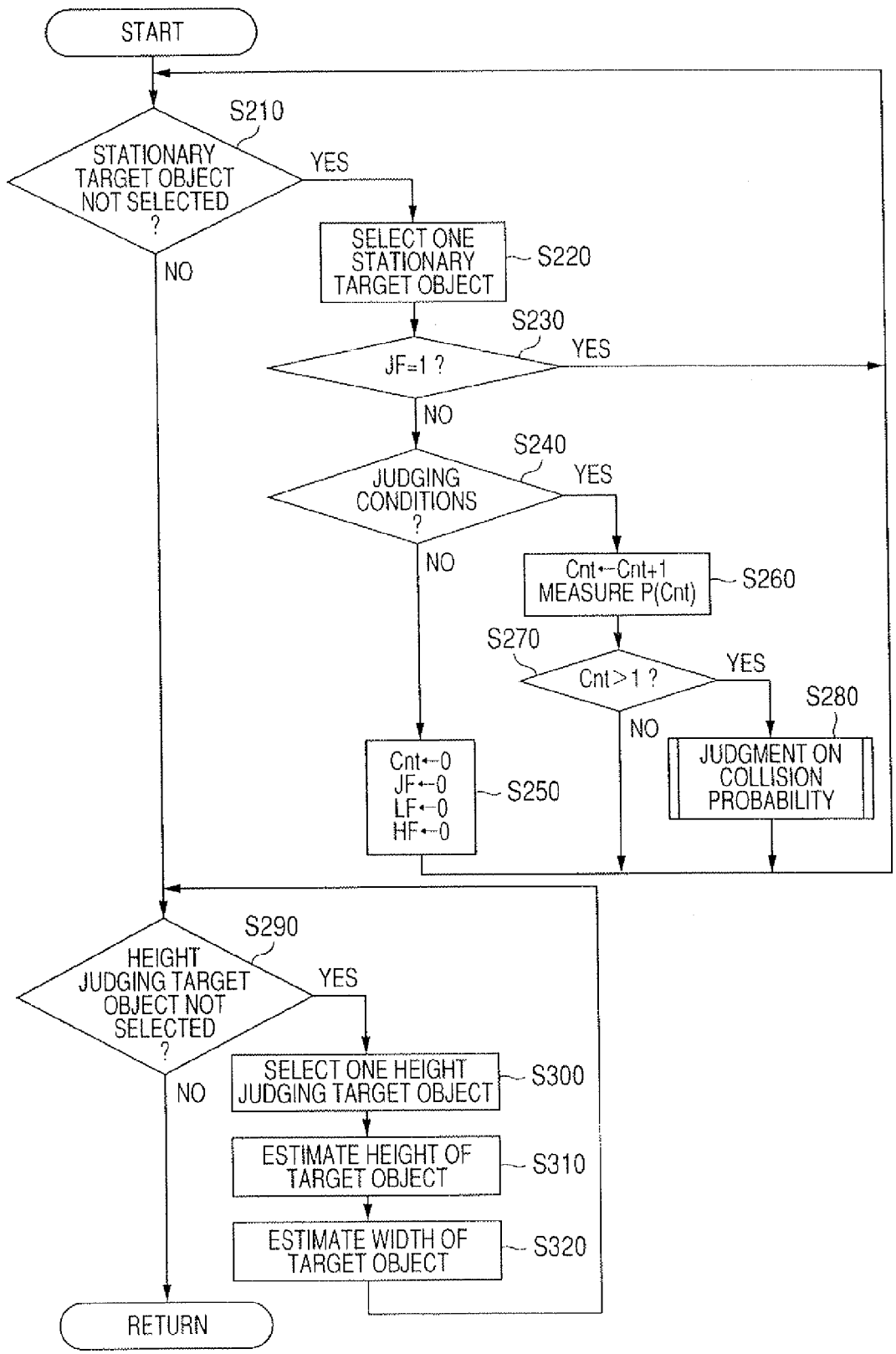
FIG. 9 is a flow chart showing an information estimating process executed in the radar sensor.

The information estimating process performed in the estimating section 270 will be described in detail with reference to FIG. 9. FIG. 9 is a flow chart showing the information estimating process.

To estimate information (e.g., height and width) about each of the target objects in this process, the type of the target object is first judged. When the relative speed of the target object to the controlled vehicle is substantially equal to the vehicle speed obtained from the vehicle speed information of the ECU 30, the target object is at a standstill. Therefore, the object type judging unit 271 judges the target object to be a stationary target object. When the relative speed substantially differs from the vehicle speed, the target object is moved. Therefore, the judging unit 271 judges the target object to be a moving target object. There is a probability that the moving target object collides with the controlled vehicle. Further, there is a probability that the stationary target object denoting the middle-height target object collides with the controlled vehicle. In the information estimating process, when the target object is a moving target object or a stationary target object denoting a middle-height target object, the height and width of the target object are estimated as information on the target object.

Further, the estimating section 270 prepares parameters, associated with each stationary target object, such as a counting number Cnt, a judgment completing flag JF, a low position flag LF and a high position flag HF. The counting number Cnt indicates the number of measuring periods in which the information estimating process is performed for the stationary target object. The judgment completing flag JF set at 1 indicates the completion of a judgment on the probability of collision of the controlled vehicle with the stationary target object. When recognizing the completion of the judgment for the stationary target object from the flag JF, the estimating section 270 stops the further judgment for the stationary target object. The low position flag LF set at 1 indicates that the stationary target object denotes a low-position target object having no possibility of collision with the controlled vehicle. The high position flag HF set at 1 indicates that the stationary target object denotes a high-position target object having no possibility of collision with the controlled vehicle. The estimating section 270 initializes the parameters Cnt, JF, LF and HF of each stationary target object at 0.

As shown in FIG. 9, at step S210, the collision probability judging unit 273 judges whether or not at least one stationary target object not yet selected in this process exists in the target objects recognized by the unit 267. In the case of an affirmative judgment at step S210, each of the stationary target objects not yet selected is judged to be a low-position target object having the height lower than 10 cm, a middle-height target object having the height between 10 cm and 350 cm or a high-position target object having the height higher than 350 cm.

More specifically, at step S220, one stationary target object not yet selected is selected as a first selected target object. At step S230, it is judged whether or not the judgment completing flag JF associated with the first selected target object is set at 1. In the case of an affirmative judgment at step S230, a judgment on the probability of collision has been already performed in one of preceding measuring periods, and the first selected target object has been already recognized as a low-position target object, a middle-height target object or a high-position target object. Therefore, the procedure returns to step S210.

In contrast, in the case of a negative judgment at step S230, because the judgment on the probability of collision is not yet performed, at step S240, it is judged whether or not the first selected target object satisfies judging conditions. For example, when the distance R to the first selected target object is longer than 20 m and is equal to or shorter than 200 m while the speed V of the controlled vehicle is equal to or higher than 10 km/hr (20 m<R≦200 m, and V≧10 km/hr), the first selected target object satisfies the judging conditions. In case of R≦20 m, the judgment on the probability of collision is difficult due to directivity of the antennas 16 and 20. In case of V<10 km/hr, the judgment is not required.

In the case of a negative judgment at step S240, no judgment on the probability of collision is performed for the first selected target object. Then, at step S250, the parameters Cnt, JF, LF and HF of the first selected target object are cleared to 0, and the procedure returns to step S210. Therefore, the judgment is not performed until the first selected target object satisfies the judging conditions in one of succeeding measuring periods.

In contrast, in the case of an affirmative judgment at step S240, at step S260, the counting number Cnt is incremented by 1, and the electric power P (Cnt) of the radar waves reflected from the first selected target object is measured and stored. Then, at step S270, it is judged whether or not the counting number Cnt is higher than 1 (Cnt>1). In the case of a negative judgment at step S270, because the electric power P (Cnt) is measured for the first time in this measuring period, a change in the power cannot be calculated. Therefore, no judgment on the probability of collision is performed, and the procedure returns to step S210.

In contrast, in the case of an affirmative judgment at step S270, at step S280, a judgment on the probability of collision of the controlled vehicle with the first selected target object is performed. In this judgment, when the first selected target object is a middle-height target object, it is judged that there is a probability that the controlled vehicle collides with the first selected target object. In contrast, when the first selected target object is a low-position target object (e.g., a lid of a man hole) or a high-position target object (e.g., a traffic signal), it is judged that there is no possibility that the controlled vehicle collides with the first selected target object. Then, the procedure returns to step S210.

Figure 10:
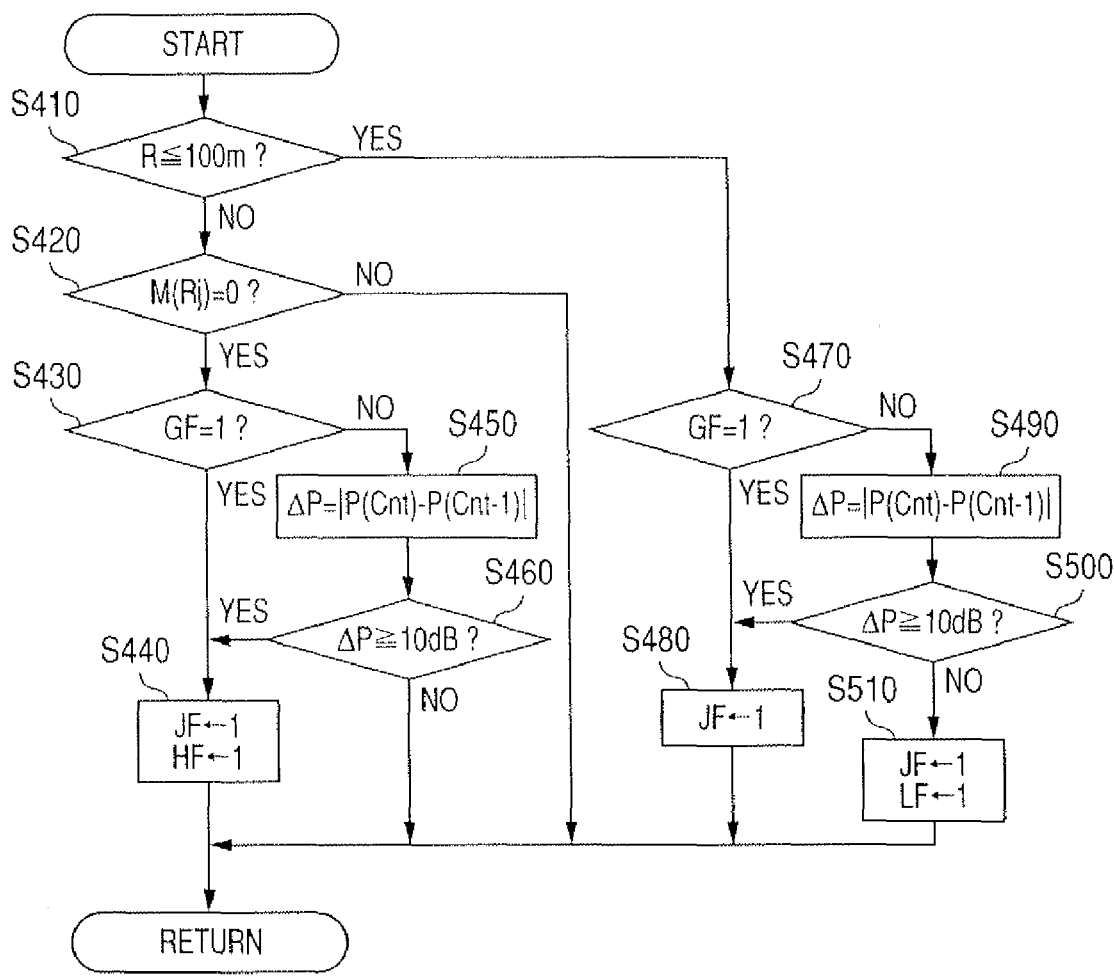
FIG. 10 is a flow chart showing a judgment on a probability of collision in the information estimating process.

The judgment on the probability of collision of the controlled vehicle with the first selected target object performed at step S280 will be described in detail with reference to FIG. 10. FIG. 10 is a flow chart showing the judgment on the probability of collision.

In this judgment, the distance R is shortened with the elapsed time. Therefore, each time this judgment is performed in one measuring period, the distance R is shortened. Further, when the first selected target object is judged in the present measuring period to be a low-position target object, a middle-height target object or a high-position target object, the judgment completing flag JF corresponding to the first selected target object is set at 1, and no judgment is performed for the first selected target object in the succeeding measuring period. Moreover, even when the judgment is not yet performed for the first selected target object in the present measuring period, the judgment is performed for the first selected target object in one of the succeeding measuring periods.

As shown in FIG. 10, at step S410, it is judged whether or not the distance R to the first selected target object is equal to or shorter than 100 m. The distance R is at first longer than 100 m and is shortened with time to be lower than 100 m.

In the case of a negative judgment at step S410 (i.e., 100 m<R≦200 m), at step S420, the distance region Rj including the distance R is specified, and it is judged whether or not the map value M (Rj) of the modeled pattern P200 in the distance region Rj is set at 0. In the case of a negative judgment at step S420 (M=1), it is realized that the distance R to the first selected target object in the present measuring period is placed in the distance region R120, R140 or R180 (see FIG. 7). Because both the map values M of the modeled patterns R200 and R350 are set at 1 together in any of the distance regions R120, R140 and R180, it is impossible to judge, by using the modeled patterns R200 and R350, whether or not the first selected target object is a middle-height target object or a high-position target object. Therefore, this judgment in this measuring period is ended.

In contrast, in the case of an affirmative judgment at step S420 (M=0), it is realized that the distance R to the first selected target object in the present measuring period is placed in the distance region R110, R130, R150, R160, R170, R190 or R200 (see FIG. 7). Then, at step S430, it is judged whether or not the flag GF associated with the first selected target object is set at 1. In the case of an affirmative judgment at step S430 (GF=1), it is realized that the first selected target object corresponds to the extrapolated pair produced in the target object extrapolating process of the producing unit 268. Therefore, the distance R to the first selected target object in the present measuring period is substantially equal to one null distance $R_{null}$ corresponding to one null point. Because the map value M of only the modeled pattern R350 is set at 1 in any of the distance regions R110, R130, R150, R160, R170, R190 or R200, it is realized that an actual null point pattern of the first selected target object matches with or is similar to the modeled pattern R350 of the representative high-position target object. Therefore, it is judged that the first selected target object is one high-position target object placed to be higher than any middle-height target object. Then, at step S440, the flag JF is set at 1, and the flag HF is set at 1 to specify the first selected target object as one high-position target object.

In contrast, in the case of a negative judgment at step S430 (GF=0), it is realized that the first selected target object corresponds to the present actual pair produced in the tracking unit 267. Then, at step S450, the absolute value of the difference between the electric power P(Cnt) of the waves received in the present measuring period and the electric power P(Cnt−1) of the waves received in the preceding measuring period is calculated as a change ΔP of the electric power in one measuring period Tm. When the distance R is substantially equal to one null distance $R_{null}$ corresponding to one null point, the electric power change ΔP become large.

Then, at step S460, it is judged whether or not the electric power change ΔP is equal to or larger than a first null judging limit such as 10 dB. In the case of an affirmative judgment at step S460, it is realized that the distance R to the first selected target object in the present measuring period is substantially equal to one null distance $R_{null}$ corresponding to one null point. Because the map value M of only the modeled pattern R350 is set at 1 in any of the distance regions R110, R130, R150, R160, R170, R190 or R200, it is realized that an actual null point pattern of the first selected target object matches with or is similar to the modeled pattern R350. Therefore, it is judged that the first selected target object is a high-position target object. Then, at step S440, the flags JF and HF are set at 1 together.

In contrast, in the case of a negative judgment at step S460, the distance R differs from any null distance $R_{null}$. Because the map values M of the modeled patterns R10 and R200 are set at 0 together in any of the distance regions R110, R130, R150, R160, R170, R190 or R200, it is realized that an actual null point pattern of the first selected target object matches with or is similar to the modeled pattern R10 or R200. Therefore, it is realized that the first selected target object is not a high-position target object but is a middle-height target object or a low-position target object. Because it is impossible to judge whether or not the first selected target object is a middle-height target object or a low-position target object, the procedure is ended.

Therefore, when the first selected target object is a high-position target object, the flag JF associated with the first selected target object is necessarily set at 1 in one of the measuring periods in which the distance R shortened with time is longer than 100 m. In other words, the first selected target object not associated with the flag JF=1 is a middle-height target object or a low-position target object.

When the distance R is shortened with time, the distance R becomes equal to or shorter than 100 m. In the case of an affirmative judgment at step S410 (20 m<R≦100 m), the judgment on the probability of collision is performed for the first selected target object which is a middle-height target object or a low-position target object. Then, at step S470, it is judged whether or not the flag GF associated with the first selected target object is set at 1. In the case of an affirmative judgment at step 470 (GF=1), the first selected target object corresponds to the extrapolating pair produced in the extrapolating unit 268. Therefore, the distance R to the first selected target object in the present measuring period is equal to one null distance $R_{null}$. Because the modeled pattern P200 of the representative middle-height target object has one null point, recognized as null distances $R_{null}$, in the distance region of 20 m<R≦100 m while the modeled pattern P10 has no null point in the distance region of 20 m<R≦100 m, it is judged that the first selected target object is one middle-height target object. Then, at step S480, the flag JF is set at 1 while the flags LF and HF are maintained at 0 to specify the first selected target object as one middle-height target object.

In contrast, in the case of a negative judgment at step S470 (GF=0), the first selected target object corresponds to the present actual pair produced in the tracking unit 267. Then, at step S490, a change ΔP of the electric power in one measuring period Tm is calculated from the absolute value of the difference between the values P(Cnt) and P(Cnt−1) of the electric power. When the distance R is substantially equal to one null distance $R_{null}$, the electric power change ΔP become large.

Then, at step S500, it is judged whether or not the change ΔP is equal to or larger than a second null judging limit such as 10 dB. In the case of an affirmative judgment at step S500, it is judged that the distance R to the first selected target object in the present measuring period is equal to one null distance $R_{null}$. Because the modeled patter P200 has one null point recognized as null distances $R_{null}$ in the distance region R100 (i.e., 20 m<R≦100 m) while the modeled patter P10 has no null point in the distance region R100, it is realized that the first selected target object denotes one middle-height target object. Therefore, at step S480, the flag JF is set at 1.

In contrast, in the case of a negative judgment at step S500, because the distance R differs from any null distance $R_{null}$, the first selected target object is not any middle-height target object but is one low-position target object. Therefore, at step S510, the flags JF and LF are set at 1 together to specify the first selected target object as one low-position target object. Then, the procedure is ended.

Therefore, in the judgment on the probability of collision shown in FIG. 10, each stationary target object judged to be a high-position target object is associated with the flags JF=1 and HF=1, each stationary target object judged to be a low-position target object is associated with the flags JF=1 and LF=1, and each stationary target object judged to be a middle-height target object is associated with the flags JF=1, HF=0 and LF=0. Accordingly, each stationary target object, for which the judgment is performed, can be recognized as a low-position target object having a height lower than 10 cm, a middle-height target object having a height between 10 cm and 350 cm or a high-position target object having a height higher than 350 cm.

As shown in FIG. 9, in the case of a negative judgment at step S210, all stationary target objects judged in the judging unit 271 have been selected in this process, or no stationary target object is judged in the judging unit 271. Therefore, the estimating section 270 estimates the height and width of each target object having a probability that the controlled vehicle collides with the target object. More specifically, the setting unit 274 specifies the moving target objects and the stationary target objects, associated with the flags JF=1 HF=0 and LF=0, as height judging target objects having the probability of collision. Each stationary target object associated with the flags JF=1, HF=0 and LF=0 denotes a middle-height target object.

Then, at step S290, in the setting unit 274, it is judged whether or not at least one height judging target object, of which the height is not yet judged in this process, exists. In the case of an affirmative judgment at step S290, at step S300, each height judging target object, of which the height is not yet judged, is selected as a second selected target object.

Then, at step S310, the setting unit 274 sets the object distance R to the second selected target object as one null distance $R_{null}$, each time electric power P of the received radar waves is reduced to a minimal value in the tracking term.

Thereafter, the actual null point pattern producing unit 275 produces an actual null point pattern of the second selected target object from the recognized null distances corresponding to null points, and collates the actual pattern with each of the modeled null point patterns prepared in the preparing unit 272. Then, one modeled null point pattern matching with or most similar to the actual pattern is determined, and the height corresponding to the determined null point pattern is estimated as the height of the second selected target object.

The actual pattern is produced in the same manner as the processing at steps S430, S450 and S460. More specifically, when the second selected target object corresponds to one extrapolated pair, the distance R detected in this measuring period is equal to one null distance $R_{null}$. Therefore, one null point corresponding to this distance R is set in the actual pattern. In contrast, when the second selected target object corresponds to the present actual pair having the record connection with the preceding actual pair, a change $\Delta P=|P(Cnt)-P(Cnt-1)|$ of the electric power is calculated. Each time the relation $\Delta P \geq 10$ dB is satisfied in one measuring period, one null point corresponding to the distance R measured in this measuring period is set in the actual pattern. Therefore, the actual pattern is produced.

Then, at step S320, the second selected target object is regarded as a vehicle, and the width of the second selected target object is estimated from the general ratio of the vehicle width to the vehicle height. As the vehicle is heightened, the width of the vehicle is usually increased. Then, the procedure returns to step S290. In contrast, in the case of a negative judgment at step S290, the procedure is ended.

Therefore, in the information estimating process shown in FIG. 9, a judgment on a probability of collision of the controlled vehicle with each stationary target object is performed, and the height and width of each of the moving target objects and the stationary target objects judged to be middle-height target objects are estimated.

As described above, in this embodiment, the tracking unit 267 tracks each detected object while the detecting unit 264 measures the distance R to the detected object changing with time every measuring period Tm. When the detected object is successfully tracked, the tracking unit 267 sets the detected object as a target object. Further, the preparing unit 272 prepares in advance the modeled null point patterns corresponding to various heights from the road surface. The setting unit 274 sets the distance R changing with time as one null distance $R_{null}$ each time the electric power P of the received waves is set at a minimal value, and the producing unit 275 produces an actual null point pattern from the null distances $R_{null}$. The estimating unit 276 collates the actual pattern with each of the modeled patterns, determines one modeled pattern matching with or most similar to the actual pattern, and estimates the height corresponding to the determined matched pattern as the height of the target object.

Accordingly, because the height of the target object is estimated based on the collation of the actual pattern with the modeled patterns corresponding to various heights, the device 1 can estimate the height of the target object as information about the target object at a low computing load.

Further, the judging unit 273 judges the moving target objects and the stationary target objects having middle heights to be target objects having a probability of collision with the controlled vehicle, and the estimating unit 276 estimates heights of only the target objects having a probability of collision with the controlled vehicle.

Accordingly, because the cruise control section 2 is not disturbed by information about target objects having no possibility of collision with the controlled vehicle, the cruise control section 2 receiving information about only target objects having a probability of collision with the controlled vehicle can quickly control the driving of the controlled vehicle with high precision.

Moreover, the judging unit 273 specifies stationary target objects having a probability of collision with the controlled vehicle by referring to only three modeled patterns such as the modeled pattern P10 of the representative low-position target object, the modeled pattern P200 of the representative middle-height target object and the modeled pattern P350 of the representative high-position target object. The controlled vehicle can reliably pass over low-position target objects, and can reliably pass under high-position target objects. The controlled vehicle cannot pass over or under any of middle-height target objects.

Accordingly, because only three modeled patterns are referred to, stationary target objects having a probability of collision with the controlled vehicle can be quickly specified or detected at a low computing load. Further, because each stationary target object having a probability of collision with the controlled vehicle is specified on condition that the controlled vehicle cannot pass over or under the stationary target object, the stationary target objects having a probability of collision can be reliably specified.

Furthermore, the target object such as the moving target object or the static target object having a probability of collision with the controlled vehicle is regarded as a vehicle, the determined height of the target object is regarded as the height of the vehicle, and the width of the target object is estimated according to the general ratio of the height to the width in the vehicle.

Accordingly, when the estimated width is used to judge whether or not the controlled vehicle can be safely moved into a position between two other vehicles or can be safely moved out from a position between two other vehicles or to calculate a probability of the lapped collision of the controlled vehicle with another vehicle, the reliability in the control of the vehicle can be heightened.

In this embodiment, without considering the height of the controlled vehicle or the height of the lower portion of the body in the controlled vehicle, the modeled null point pattern P10 corresponding to the height of 10 cm represents a null point pattern of the low-position target object, and the modeled null point pattern P350 corresponding to the height of 350 cm represents a null point pattern of the high-position target object. However, a first modeled null point pattern corresponding to a height higher than the height of the controlled vehicle may be used so as to represent a null point pattern of the high-position target object, and a second modeled null point pattern corresponding to a height lower than the height of the lower portion of the body in the controlled vehicle may be used so as to represent a null point pattern of the low-position target object. The signal processor 26 stores both the height of the controlled vehicle and the height of the lower portion of the body in the controlled vehicle. Further, a specific modeled null point pattern corresponding to a height higher than the height of the lower portion of the body and lower than the height of the controlled vehicle may be used so as to represent a null point pattern of the middle-height target object. The first and second modeled null point patterns are used at step S310 shown in FIG. 9, and the specific modeled null point pattern is used at step S420 shown in FIG. 10.

Figure 1:
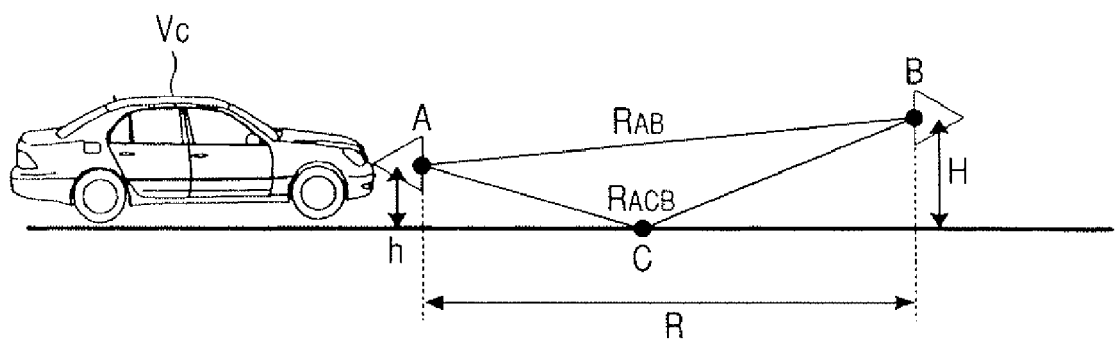
FIG. 1 is an explanatory view showing reflected waves returned from a target object to a radar apparatus through respective paths.

Further, in this embodiment, as shown in FIG. 1, the transmission signal Ss of the radar sensor 1 is directly transmitted to a target object through the transmission path of the transmission distance $R_{AB}$ without being reflected by another object. However, the transmission signal Ss transmitted to a target object may be reflected by another object such as a road before reaching the target object. In this case, the equation required to prepare modeled null point patterns is, for example, described in detail in "Estimation of Received Signal Characteristics for Millimeter Wave Car Radar", Technical Journal R&D review of Toyota CRDL, Vol. 32, No. 2 (1997.6), Research Report.

Moreover, in this embodiment, one of the reflected waves is directly returned to the radar sensor 1. However, each of the reflected waves may be returned to the radar sensor 1 while being again reflected on another object such as a road.

Furthermore, in this embodiment, the object height estimating unit estimates the height of each of the moving target object and the stationary target objects judged to have a probability of collision with the controlled vehicle. However, the object height estimating unit may estimate the height of each of only the stationary target objects judged to have a probability of collision with the controlled vehicle. In this case, because each stationary target object necessarily approaches the controlled vehicle, the electric power of the received radar waves can be reliably measured at each of various object distances R, the actual null point pattern of the stationary target object can be formed with high precision, and the collation of the actual pattern with the modeled patterns can be performed with high precision.

Modification

In the embodiment, when the judging unit 271 judges the target object to be a stationary target object, the judging unit 273 judges whether or not the stationary target object is a middle-height target object having a probability of collision with the controlled vehicle. When the stationary target object has a probability of collision with the controlled vehicle, the object height estimating unit 276 collates the actual null point pattern corresponding to the height of the stationary target object with each of the modeled null point patterns corresponding to the heights ranging from 0 to 350 cm at the intervals of 10 cm to estimate the height on the target object.

In this modification, in place of the estimation of the height of the target object in the estimating unit 276, a probability of collision of the target object with the controlled vehicle is estimated, as information about the target object in a collision probability estimating unit.

More specifically, the controlled vehicle can pass under a stationary target object having the height equal to or higher than 350 cm (i.e., first height) and can pass over a stationary target object having the height equal to or lower than 10 cm (i.e., second height). Therefore, when the object type judging unit 271 judges the target object to be a stationary target object, the judgment in the judging unit 273 is not performed, but the collision probability estimating unit collates the actual null point pattern with each of two modeled null point patterns P10 and P350 corresponding to the heights of 10 cm and 350 cm. In this case, when the actual pattern substantially matches with the modeled null point pattern corresponding to the height of 10 cm or the modeled null point pattern corresponding to the height of 350 cm, the estimating unit estimates the target object to be a low-position target object or a high-position target object and to have no possibility of collision with the controlled vehicle, as information on the target object, and outputs the information to notify the driver of the information. When the actual pattern differs from any of the modeled null point patterns P20 and P350, the estimating unit estimates the target object to be a middle-height target object and to have a probability of collision with the controlled vehicle, as information on the target object, and outputs the information to notify the driver of the information.

Accordingly, the radar sensor 1 can reliably judge, at a low computing load, whether or not the controlled vehicle can pass under or over the target object and can easily distinguish the target object having no possibility of collision with the controlled vehicle from the target object having a probability of collision with the controlled vehicle, at a low computing load.

Further, when the object type judging unit 271 judges the target object to be a stationary target object, the estimating unit may collate the actual null point pattern with only one modeled null point pattern corresponding to the height of 10 cm or 350 cm. In this case, when the actual pattern substantially matches with the modeled null point pattern, the estimating unit 276 estimates the target object to be a low-position target object or a high-position target object and to have no possibility of collision with the controlled vehicle, as information on the target object, and outputs the information to notify the driver of the information. In contrast, when the actual pattern differs from the modeled null point pattern, the estimating unit 276 estimates the target object to be a middle-height target object and to have a probability of collision with the controlled vehicle, as information on the target object, and outputs the information to notify the driver of the information.

Accordingly, although the reliability in the judgment whether or not the controlled vehicle can pass through the target object is lowered, the radar sensor 1 can further easily distinguish the lower-position target object or the higher-position target object having no possibility of collision with the controlled vehicle from another type target object.

In this modification, the height of the controlled vehicle or the height of the lower portion of the body in the controlled vehicle is not considered. However, a modeled null point pattern corresponding to a height higher than the height of the controlled vehicle may be used so as to represent a null point pattern of the high-position target object, and a modeled null point pattern corresponding to a height lower than the height of the lower portion of the body in the controlled vehicle may be used so as to represent a null point pattern of the low-position target object. The radar sensor 1 judges, by using these two modeled null point patterns, whether or not the controlled vehicle can pass under or over the target object.

Accordingly, the radar sensor 1 can reliably perform the judgment whether or not the controlled vehicle can pass under or over the target object.

This embodiment should not be construed as limiting the present invention to the structure of the embodiment, and the structure of this invention may be combined with that based on the prior art.

What is claimed is:

1. A target object information estimating device, comprising:
an object detecting unit that
outputs a transmission signal of a radar wave every measuring period of time, receives a signal of the radar wave, which is reflected on a target object located on or over a reference surface and is returned to the device through a first transmission path having a first length, and the radar wave which is reflected on the target object and is returned to the device through a second transmission path having a second length different from the first length, and calculates an object distance, from the device to the target object, from the transmission signal and the received signal in each of the measuring periods to detect the target object, the object distance being changed with time;

an object tracking unit that tracks the target object detected by the object detecting unit in a tracking term including a plurality of measuring periods;

a null distance setting unit that sets the object distance calculated by the object detecting unit, when the target object is tracked by the object tracking unit, as a null distance, each time electric power of the received radar waves is reduced to a minimal value;

a modeled null point pattern preparing unit that prepares a modeled null point pattern indicating a modeled pattern of null points for each of a plurality of heights; and an information estimating unit that produces an actual null point pattern indicating a pattern of null points corresponding to the respective null distances set by the null distance setting unit, collates the actual null point pattern with the modeled null point patterns to obtain a collation result, and estimates a height of the target object from the collation result as information about the target object, wherein the target object information estimating device is mounted in a moving vehicle which can pass under an object being placed over a road surface and having a height equal to or higher than a first height or can pass over an object having a height equal to or lower than a second height, the modeled null point pattern preparing unit prepares the modeled null point pattern corresponding to the first height or the second height, and the information estimating unit comprises:

an object type judging unit that judges whether or not the target object is a stationary target object; and a collision probability judging unit that, when the object type judging unit judges the target object to be a stationary target object, collates the actual null point pattern with the modeled null point pattern corresponding to the first height or the second height, judges the target object to have no possibility of collision with the vehicle when the actual pattern substantially matches with the modeled null point pattern, and judges the target object to have a possibility of collision with the vehicle when the actual pattern differs from the modeled null point pattern.

2. A target object information estimating device mounted in a moving vehicle comprising:

an object detecting unit that outputs a transmission signal of a radar wave every measuring period of time, receives a signal of the radar wave, which is reflected on a target object located on or over a reference surface and is returned to the device through a first transmission path having a first length, and the radar wave which is reflected on the target object and is returned to the device through a second transmission path having a second length different from the first length, and calculates an object distance, from the device to the target object, from the transmission signal and the received signal in each of the measuring periods to detect the target object, the object distance being changed with time;

an object tracking unit that tracks the target object detected by the object detecting unit in a tracking term including a plurality of measuring periods;

a null distance setting unit that sets the object distance calculated by the object detecting unit, when the target object is tracked by the object tracking unit, as a null distance, each time electric power of the received radar waves is reduced to a minimal value;

a modeled null point pattern preparing unit that prepares a modeled null point pattern indicating a modeled pattern of null points for each of a plurality of heights, the modeled null point pattern preparing unit dividing an area of the object distance into a plurality of distance regions, and further preparing a plurality of modeled null point patterns corresponding to the respective heights, the modeled null point patterns having distinctive null point patterns of null points corresponding to the respective null distances set by the null distance setting unit such that as the height is increased, a distance interval between adjacent null points is narrowed; and an information estimating unit that produces an actual null point pattern indicating a pattern of null points corresponding to the respective null distances set by the null distance setting unit, collates the actual null point pattern with the modeled null point patterns to obtain a collation result, and estimates a height of the target object from the collation result as information about the target object, wherein the vehicle can pass under an object being placed over a road surface and having a height equal to or higher than a first height and can pass over an object having a height equal to or lower than a second height, and the information estimating unit further includes an object width estimating unit that, when the estimated height of the target object is estimated to be between the first and second heights, regards the target object as a vehicle, and estimates a width of the target object from the estimated height of the target object.

3. A target object information estimating device, comprising:

an object detecting unit that outputs a transmission signal of a radar wave every measuring period of time, receives a signal of the radar wave, which is reflected on a target object located on or over a reference surface and is returned to the device through a first transmission path having a first length, and the radar wave which is reflected on the target object and is returned to the device through a second transmission path having a second length different from the first length, and calculates an object distance, from the device to the target object, from the transmission signal and the received signal in each of the measuring periods to detect the target object, the object distance being changed with time;

an object tracking unit that tracks the target object detected by the object detecting unit in a tracking term including a plurality of measuring periods;

a null distance setting unit that sets the object distance calculated by the object detecting unit, when the target object is tracked by the object tracking unit, as a null distance, each time electric power of the received radar waves is reduced to a minimal value;

a modeled null point pattern preparing unit that prepares a modeled null point pattern indicating a modeled pattern of null points for each of a plurality of heights;

an information estimating unit that produces an actual null point pattern indicating a pattern of null points corresponding to the respective null distances set by the null distance setting unit, collates the actual null point pattern with the modeled null point patterns to obtain a collation result, and estimates a height of the target object from the collation result as information about the target object; and an extrapolating unit that performs an extrapolating process for the target object, which is detected by the object detecting unit in a first measuring period but is not tracked by the object tracking unit in a second measuring period succeeding the first measuring period, to estimate an object distance to the target object according to extrapolation, wherein the null distance setting unit sets the object distance estimated by the extrapolating unit as a null distance, regardless of the electric power of the received radar waves.

4. A target object information estimating device, comprising:

an object detecting unit that
outputs a transmission signal of a radar wave every measuring period of time,
receives a signal of the radar wave, which is reflected on a target object located on or over a reference surface and is returned to the device through a first transmission path having a first length, and the radar wave which is reflected on the target object and is returned to the device through a second transmission path having a second length different from the first length, and
calculates an object distance, from the device to the target object, from the transmission signal and the received signal in each of the measuring periods to detect the target object, the object distance being changed with time;

an object tracking unit that tracks the target object detected by the object detecting unit in a tracking term including a plurality of measuring periods;

a null distance setting unit that sets the object distance calculated by the object detecting unit, when the target object is tracked by the object tracking unit, as a null distance, each time electric power of the received radar waves is reduced to a minimal value;

a modeled null point pattern preparing unit that prepares a modeled null point pattern indicating a modeled pattern of null points for each of a plurality of heights; and an information estimating unit that produces an actual null point pattern indicating a pattern of null points corresponding to the respective null distances set by the null distance setting unit, collates the actual null point pattern with the modeled null point patterns to obtain a collation result, and estimates a height of the target object from the collation result as information about the target object, wherein the null distance setting unit sets the object distance as a null distance, when a difference between the electric power of the received radar waves in a first measuring period and the electric power of the received radar waves in a second measuring period succeeding the first measuring period is larger than an allowable limit.

5. A target object information estimating device, comprising:

an object detecting unit that
outputs a transmission signal of a radar wave every measuring period of time,
receives a signal of the radar wave, which is reflected on a target object located on or over a reference surface and is returned to the device through a first transmission path having a first length, and the radar wave which is reflected on the target object and is returned to the device through a second transmission path having a second length different from the first length, and
calculates an object distance, from the device to the target object, from the transmission signal and the received signal in each of the measuring periods to detect the target object, the object distance being changed with time;

an object tracking unit that tracks the target object detected by the object detecting unit in a tracking term including a plurality of measuring periods;

a null distance setting unit that sets the object distance calculated by the object detecting unit, when the target object is tracked by the object tracking unit, as a null distance, each time electric power of the received radar waves is reduced to a minimal value;

a modeled null point pattern preparing unit that prepares a modeled null point pattern indicating a modeled pattern of null points for each of a plurality of heights; and an information estimating unit that produces an actual null point pattern indicating a pattern of null points corresponding to the respective null distances set by the null distance setting unit, collates the actual null point pattern with the modeled null point patterns to obtain a collation result, and estimates a height of the target object from the collation result as information about the target object, wherein the information estimating unit comprises:

an object type judging unit that receives a speed of a moving vehicle, in which the target object information estimating device is mounted, and judges the target object to be a stationary target object when a relative speed of the target object to the vehicle is substantially equal to the speed of the vehicle, wherein the information estimating unit estimates the height of the target object when the object type judging unit judges the target object to be a stationary target object.

6. A target object information estimating device, comprising:

an object detecting unit that
outputs a transmission signal of a radar wave every measuring period of time,
receives a signal of the radar wave, which is reflected on a target object located on or over a reference surface and is returned to the device through a first transmission path having a first length, and the radar wave which is reflected on the target object and is returned to the device through a second transmission path having a second length different from the first length, and
calculates an object distance, from the device to the target object, from the transmission signal and the received signal in each of the measuring periods to detect the target object, the object distance being changed with time;

an object tracking unit that tracks the target object detected by the object detecting unit in a tracking term including a plurality of measuring periods;

a null distance setting unit that sets the object distance calculated by the object detecting unit, when the target object is tracked by the object tracking unit, as a null distance, each time electric power of the received radar waves is reduced to a minimal value;

a modeled null point pattern preparing unit that prepares a modeled null point pattern indicating a modeled pattern of null points for each of a plurality of heights; and an information estimating unit that produces an actual null point pattern indicating a pattern of null points corresponding to the respective null distances set by the null distance setting unit, collates the actual null point pattern with the modeled null point patterns to obtain a collation result, and estimates a height of the target object from the collation result as information about the target object, wherein the target object information estimating device is mounted in a moving vehicle which can pass under an object being placed over a road surface and having a height equal to or higher than a first height and can pass over an object having a height equal to or lower than a second height, the modeled null point pattern preparing unit prepares a first modeled null point pattern corresponding to the first height and a second modeled null point pattern corresponding to the second height, the information estimating unit comprises:

an object type judging unit that receives a speed of the vehicle, and judges the target object to be a stationary target object when a relative speed of the target object to the vehicle is substantially equal to the speed of the vehicle; and a collision probability judging unit that, when the object type judging unit judges the target object to be a stationary target object, collates the actual pattern with the first and second modeled null point patterns, judges the target object to have no possibility of collision with the vehicle when the actual pattern substantially matches with the first modeled null point pattern or the second modeled null point pattern, and judges the target object to have a probability of collision with the vehicle when the actual pattern differs from the first and second modeled null point patterns.

7. A target object information estimating device, comprising:

an object detecting unit that
outputs a transmission signal of a radar wave every measuring period of time,
receives a signal of the radar wave, which is reflected on a target object located on or over a reference surface and is returned to the device through a first transmission path having a first length, and the radar wave which is reflected on the target object and is returned to the device through a second transmission path having a second length different from the first length, and
calculates an object distance, from the device to the target object, from the transmission signal and the received signal in each of the measuring periods to detect the target object, the object distance being changed with time;

an object tracking unit that tracks the target object detected by the object detecting unit in a tracking term including a plurality of measuring periods;

a null distance setting unit that sets the object distance calculated by the object detecting unit, when the target object is tracked by the object tracking unit, as a null distance, each time electric power of the received radar waves is reduced to a minimal value;

a modeled null point pattern preparing unit that prepares a modeled null point pattern indicating a modeled pattern of null points for each of a plurality of heights; and an information estimating unit that produces an actual null point pattern indicating a pattern of null points corresponding to the respective null distances set by the null distance setting unit, collates the actual null point pattern with the modeled null point patterns to obtain a collation result, and estimates a height of the target object from the collation result as information about the target object, wherein the target object information estimating device is mounted in a moving vehicle which can pass under an object being placed over a road surface and having a height equal to or higher than a first height or can pass over an object having a height equal to or lower than a second height, the modeled null point pattern preparing unit prepares a specific modeled null point pattern corresponding to a height smaller than the first height and larger than the second height, and the information estimating unit comprises:

an object type judging unit that judges whether or not the target object is at a standstill;

a collision probability judging unit that, when the object type judging unit judges that the target object is substantially at a standstill, judges according to the specific modeled null point pattern whether or not the target object has a probability of collision with the vehicle; and an object height estimating unit that estimates the height of the target object when the collision probability judging unit judges that the target object has a probability of collision with the vehicle.

8. The device according to claim 7, wherein the modeled null point pattern preparing unit divides an area of the object distance into a first distance area and a second distance area further away from the device than the first distance area, divides the second distance area into a plurality of distance regions, and further prepares a first modeled null point pattern corresponding to the first height and a second modeled null point pattern corresponding to the second height, the first modeled null point pattern has one null point in each of the first distance area and the distance regions, the second modeled null point pattern has no null point in any of the first distance area and the distance regions, and the specific modeled null point pattern has one null point in the first distance area and has one null point in each of a part of the distance regions while having no null point in any of the other part of the distance regions.

9. The device according to claim 8, wherein the collision probability judging unit judges that the target object having the target distance placed in the second distance area has no possibility of collision with the vehicle when the target object detected by the object detecting unit in a first measuring period is not detected in a second measuring period succeeding the first measuring period or a difference between the electric power of the received radar waves in the first measuring period and the electric power of the received radar waves in the second measuring period is larger than a null judging limit, and the collision probability judging unit judges that the target object having the target distance placed in the first distance area has a probability of collision with the vehicle when the target object detected by the object detecting unit in the first measuring period is not detected in the second measuring period or the difference in the electric power is larger than another null judging limit.

10. A target object information estimating device, comprising:
an object detecting unit that
outputs a transmission signal of a radar wave every measuring period of time,
receives a signal of the radar wave, which is reflected on a target object located on or over a reference surface and is returned to the device through a first transmission path having a first length, and the radar wave which is reflected on the target object and is returned to the device through a second transmission path having a second length different from the first length, and
calculates an object distance, from the device to the target object, from the transmission signal and the received signal in each of the measuring periods to detect the target object, the object distance being changed with time;
an object tracking unit that tracks the target object detected by the object detecting unit in a tracking term including a plurality of measuring periods;
a null distance setting unit that sets the object distance calculated by the object detecting unit, when the target object is tracked by the object tracking unit, as a null distance, each time electric power of the received radar waves is reduced to a minimal value;
a modeled null point pattern preparing unit that prepares a modeled null point pattern indicating a modeled pattern of null points for each of a plurality of heights; and
an information estimating unit that produces an actual null point pattern indicating a pattern of null points corresponding to the respective null distances set by the null distance setting unit, collates the actual null point pattern with the modeled null point patterns to obtain a collation result, and estimates a height of the target object from the collation result as information about the target object, wherein
the target object information estimating device is mounted in a moving vehicle which can pass under an object being placed over a road surface and having a height equal to or higher than a first height or can pass over an object having a height equal to or lower than a second height,
the modeled null point pattern preparing unit prepares a specific modeled null point pattern corresponding to a height smaller than the first height and larger than the second height, and
the information estimating unit comprises:
an object type judging unit that receives a speed of the vehicle, and judges the target object to be a stationary target object when a relative speed of the target object to the vehicle is substantially equal to the speed of the vehicle;
a collision probability judging unit that, when the object type judging unit judges the target object to be a stationary target object, performs a first judgment whether or not the specific modeled null point pattern has the null point in a distance region including the object distance calculated by the object detecting unit when the object distance is longer than a judging value, performs a second judgment whether or not the electric power of the received radar waves is reduced to a minimal value when the first judgment indicates that the specific modeled null point pattern has no null point in the distance region, judging the target object to have no possibility of collision with the vehicle when the second judgment indicates that the electric power of the received radar waves is reduced to a minimal value, performs a third judgment whether or not the electric power of the received radar waves is reduced to a minimal value when the second judgment indicates that the electric power of the received radar waves is not reduced to any minimal value and when the object distance detected by the object detecting unit is equal to or shorter than the judging value, judging the target object to have no possibility of collision with the vehicle when the third judgment indicates that the electric power of the received radar waves is not reduced to a minimal value, and judging the target object to have a probability of collision with the vehicle when the third judgment indicates that the electric power of the received radar waves is reduced to a minimal value; and
an object height estimating unit that estimates the height of the target object when the collision probability judging unit judges that the target object has a probability of collision with the vehicle.

11. A target object information estimating device, which is mounted in a moving vehicle which can pass under an object being placed over a road surface at a height equal to or higher than a first height, comprising:
an object detecting unit that
outputs a transmission signal of a radar wave every measuring period of time,
receives a signal of the radar wave, which is reflected on a target object located on or over a reference surface and is returned to the device through a first transmission path having a first length, and the radar wave which is reflected on the target object and is returned to the device through a second transmission path having a second length different from the first length, and
calculates an object distance, from the device to the target object, from the transmission signal and the received signal in each of the measuring periods to detect the target object, the object distance being changed with time;
an object tracking unit that tracks the target object detected by the object detecting unit in a tracking term including a plurality of measuring periods;
a null distance setting unit that sets the object distance calculated by the object detecting unit, when the target object is tracked by the object tracking unit, as a null distance, each time electric power of the received radar waves is reduced to a minimal value;
a modeled null point pattern preparing unit that prepares a modeled null point pattern, indicating a modeled pattern of null points, corresponding to the first height;
an object type judging unit that judges whether or not the target object is a stationary target object;
an actual null point pattern producing unit that, when the object type judging unit judges that the target object is a stationary target object, produces an actual null point pattern indicating a pattern of null points corresponding to the respective null distances set by the null distance setting unit; and a collision probability estimating unit that collates the actual null point pattern with the modeled null point pattern prepared by the modeled null point pattern preparing unit, estimates the stationary target object to have a probability of collision with the vehicle, as information about the target object, when the actual null point pattern differs from the modeled null point pattern, and estimates the stationary target object to have no possibility of collision with the vehicle, as information about the target object, when the actual null point pattern substantially matches with the modeled null point pattern.

12. The device according to claim 11, wherein
the vehicle can pass over an object being placed on the road surface at a height equal to or lower than a second height, the modeled null point pattern preparing unit prepares a modeled null point pattern corresponding to the second height, and the collision probability estimating unit collates the actual null point pattern with the modeled null point pattern corresponding to the second height, estimates the stationary target object to have a probability of collision with the vehicle, as information about the target object, when the actual null point pattern differs from any of the modeled null point patterns corresponding to the first and second heights, and estimates the stationary target object to have no possibility of collision with the vehicle, as information about the target object, when the actual null point pattern substantially matches with the modeled null point pattern corresponding to the second height.

* * * * *